US008745262B2

(12) United States Patent
Kohli et al.

(10) Patent No.: US 8,745,262 B2
(45) **Date of Patent: *Jun. 3, 2014**

(54) ADAPTIVE NETWORK CONTENT DELIVERY SYSTEM

(71) Applicant: Juniper Networks, Inc., Sunnyvale, CA (US)

(72) Inventors: Jaspal Kohli, Sunnyvale, CA (US); Kumar Narayanan, Saratoga, CA (US); Prabakar Sundarrajan, Saratoga, CA (US); Junxiao He, Saratoga, CA (US); Michael Nishimoto, Saratoga, CA (US); Mohammed Zubair Visharam, Sunnyvale, CA (US); Vikram Venkataraghavan, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,931

(22) Filed: Jan. 14, 2013

(65) Prior Publication Data

US 2013/0132504 A1 May 23, 2013

Related U.S. Application Data

(63) Continuation of application No. 12/624,358, filed on Nov. 23, 2009, now Pat. No. 8,370,520.

(60) Provisional application No. 61/117,505, filed on Nov. 24, 2008, provisional application No. 61/161,376, filed on Mar. 18, 2009, provisional application No. 61/166,432, filed on Apr. 3, 2009.

(51) Int. Cl.
*G06F 15/16* (2006.01)

(52) U.S. Cl.
USPC ........... 709/233; 709/217; 709/226; 370/466; 370/352; 370/229

(58) Field of Classification Search
USPC ........... 709/233, 217, 226; 370/466, 352, 229
See application file for complete search history.

(56) References Cited

U.S. PATENT DOCUMENTS

| | | | |
|---|---|---|---|
| 6,650,618 B1 | 11/2003 | Peng et al. |
| 2002/0029274 A1 | 3/2002 | Allen |
| 2003/0099254 A1 | 5/2003 | Richter |
| 2005/0267948 A1 | 12/2005 | McKinley et al. |

(Continued)

OTHER PUBLICATIONS

International Search Report and Written Opinion for PCT Patent Application No. PCT/US09/65805, dated Apr. 8, 2010, 14 pages.

(Continued)

*Primary Examiner* — Wing F Chan
*Assistant Examiner* — Benjamin M Thieu
(74) *Attorney, Agent, or Firm* — Harrity & Harrity, LLP

(57) ABSTRACT

A method and apparatus stores media content in a variety of storage devices, with at least a portion of the storage devices having different performance characteristics. The system can deliver media to a large number of clients while maintaining a high level of viewing experience for each client by automatically adapting the bit rate of a media being delivered to a client using the client's last mile bit rate variation. The system provides clients with smooth viewing of video without buffering stops. The client does not need a custom video content player to communicate with the system.

20 Claims, 18 Drawing Sheets

(56) References Cited

U.S. PATENT DOCUMENTS

| | | | | |
|---|---|---|---|---|
| 2006/0176806 | A1* | 8/2006 | Yoshihara et al. | 370/229 |
| 2007/0058926 | A1* | 3/2007 | Virdi et al. | 386/68 |
| 2007/0162611 | A1 | 7/2007 | Yu et al. | |
| 2008/0195748 | A1 | 8/2008 | Tierney et al. | |
| 2008/0242221 | A1* | 10/2008 | Shapiro et al. | 455/3.06 |
| 2010/0131671 | A1 | 5/2010 | Kohli et al. | |

OTHER PUBLICATIONS

International Search Report and Written Opinion for PCT Patent Application No. PCT/US10/27857, dated Apr. 30, 2010, 8 pages.

* cited by examiner

1300

1500

1501

ADAPTIVE NETWORK CONTENT DELIVERY SYSTEM

CROSS-REFERENCE TO RELATED APPLICATIONS; PRIORITY CLAIM

This application is a continuation of U.S. patent application Ser. No. 12/624,358, filed Nov. 23, 2009, which claims benefit of U.S. Provisional Application Nos. 61/117,505, filed Nov. 24, 2008, 61/161,376, filed Mar. 18, 2009, and 61/166,432, filed Apr. 3, 2009, the entire contents of each is hereby incorporated by reference as if fully set forth herein.

TECHNICAL FIELD

The present disclosure generally relates to media content delivery.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Delivery of content across the Internet has been accomplished in several different ways. Content servers have been used to deliver content directly to requesting clients. As the content servers became overloaded from the traffic demands, mirroring of the content across multiple servers were implemented. Mirror servers were added as client traffic increased beyond the capacity of the installed base of mirror servers.

As mirroring became costly to the content providers, caching content in content delivery networks (CDN) became popular. The content provider's content was distributed among caching servers across the Internet. The caching servers were shared among multiple content providers and operated by a CDN provider. The caching servers were essentially file servers that served different types of files to client systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An adaptive network content delivery system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Adaptive Content Delivery over a Network
3.1 Media Flow Director Architecture
3.2 Media Flow Director Placement
4.0 Implementation Mechanisms—Hardware Overview
5.0 Examples
6.0 Extensions and Alternatives

1.0 General Overview

A method for an adaptive network content delivery system is described. In other embodiments, the invention encompasses a computer apparatus and a computer-readable medium configured to carry out the foregoing steps.

2.0 Structural and Functional Overview

Figure 1:
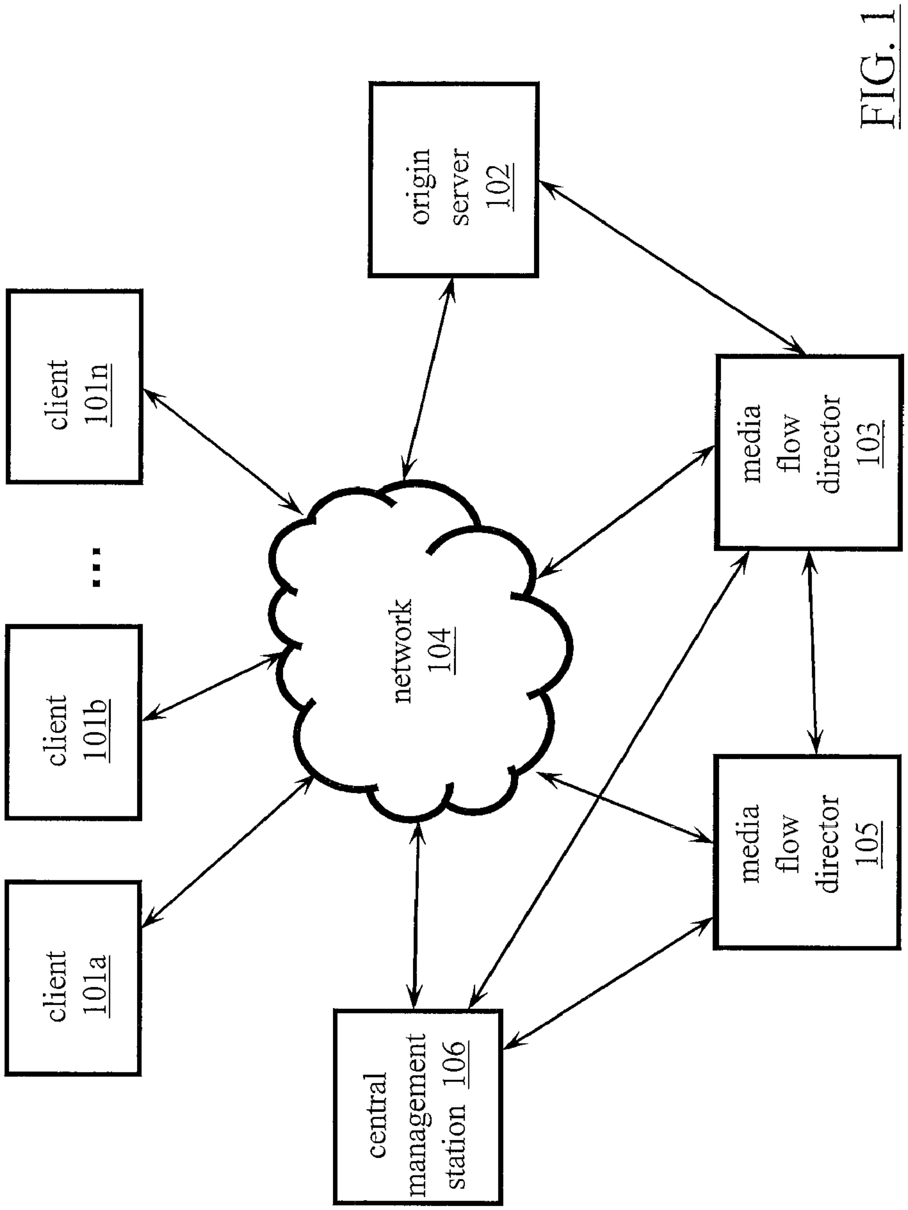
FIG. 1 illustrates a media flow director (MFD) in communication with client systems, an origin server, a peer MFD, and a central management station across a network, according to an embodiment of the invention.

An adaptive network content delivery system is described. Referring to FIG. 1, a possible embodiment provides a media flow director (MFD) 103. A MFD is a network device that can efficiently deliver video content (and other types of file content of various sizes, e.g., media (audio, pictures, etc.), games, software, HTML, scripts, etc.) over a network 104 to a plurality of clients 101*a*, 101*b*, 101*n*, via HTTP, FTP, streaming, or other protocols. Video content includes such content as feature length movies, sitcoms, variety shows, talk shows, news shows, advertisements, etc. Client devices 101*a*, 101*b*, 101*n*, may be a personal computing device such as a desktop or laptop computer, set top box, handheld computing device, cellular phone, portable media player, or any other portable device capable of displaying multimedia content, and are also coupled to network 104 through any proper interface.

The MFD 103 stores video content internally in a variety of storage devices, including HDD, SSD, RAM, non-volatile memory, etc. The MFD 103 can deliver video to a large number of clients while maintaining a high level of viewing experience for each client. The MFD 103 automatically adapts the bit rate of a video being delivered to a client 101 by measuring the client's last mile bit rate variation. The MFD provides the clients with smooth viewing of video without buffering stops. It assures delivery of in-progress videos to clients using the adaptive bit rate delivery. The MFD dynamically adapts the bit rate of the video to match the effective last mile bandwidth and to adapt to changing network conditions for the client. The MFD can dynamically measure the last mile bandwidth to the client in order to dynamically adjust the bit rate. The client does not need a custom video content player to communicate with the MFD. The MFD supports industry standard video players such as Flash, Quicktime, SilverLight, Windows Media Player, etc.

The MFD 103 provides policy controls on the storage and delivery of videos that can be defined by a customer as well as the MFD provider. The MFD can be deployed in a variety of ways across the network 104, including at an edge cache location or an origin server location. The network 104 may be implemented by any medium or mechanism that provides for the exchange of data between devices in the communication system. Examples of network 104 include, without limitation, a network such as a Local Area Network (LAN), Wide Area Network (WAN), Ethernet, intranet, the Internet, or one or more terrestrial, satellite or wireless links.

The MFD 103 communicates with network 104 through any proper communication interface, such as an Ethernet or wireless communications port. Alternatively or in addition, any number of devices connected to network 104 may also be directly connected to each other through a communications link. For example, the MFD 103 can request content from an origin server 102 via the network 104 or via a local network in order to obtain URL content when a client 101 requests a URL content that the MFD 103 does not have stored in its memory. Additionally, MFD 103 can communicate with another MFD 105 via the network 104 or via a local network in order to obtain URL content, MFD content information, MFD status, etc.

A central management station 106 may be available to allow administrators to set policies for MFD management such as cache management, bandwidth limitations, content popularity determination, etc. The central management station 106 also allows administrators to manage where and how content is stored in the multiple storage devices within a MFD. The central management station 106 may communicate via a local network or connection to MFDs 103, 105 or via network 104. An administrator logs into the central management system 106 and selects a MFD or set of MFDs that the administrator wants to interact with. The administrator can define policies and have the policies sent to a MFD or pushed out to multiple MFDs by the central management station 106. Alternatively, the MFDs may contact the central management station 106 periodically or when notified that by the central management station that updates are available for that MFD.

3.0 Adaptive Content Delivery Over a Network

3.1 Media Flow Director Architecture

Figure 2:
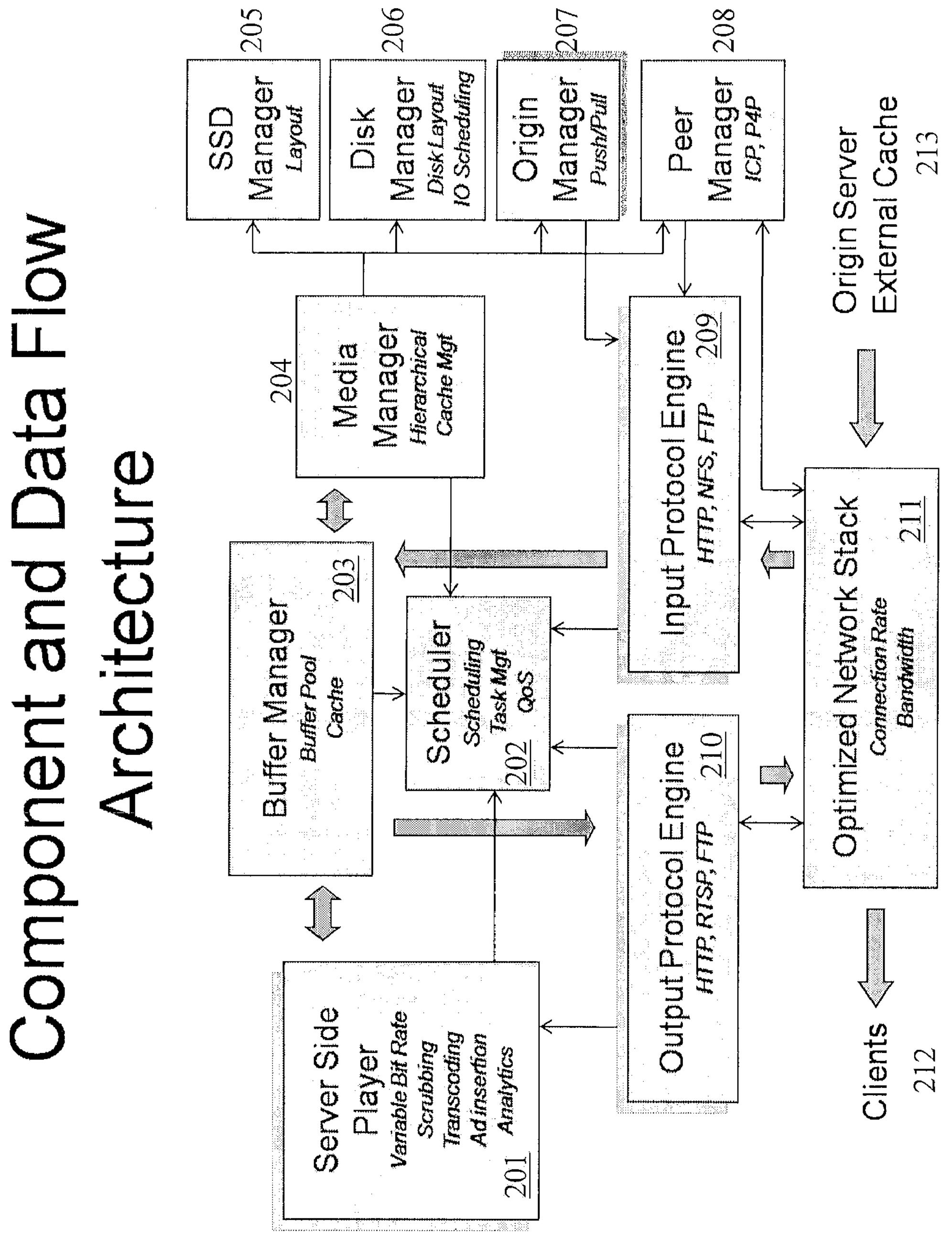
FIG. 2 illustrates an example of an MFD component and data flow architecture, according to an embodiment of the invention.

FIG. 2 illustrates a possible embodiment showing the architecture of a content delivery switch that is configured as a MFD to deliver video content. The components in the architecture are described below.

Output Protocol Engine 210

The output protocol engine 210 handles requests from clients. A client sends a request to the MFD to make a connection with client, e.g., an HTTP get request for a particular URL, the output protocol engine 210 passes for requests URL content to the server side player 201.

Server Side Player 201

The server side player 201 is primarily responsible for the encapsulation and enforcement of video specific logic for each video stream. Such an enforcement could happen both at the inbound side when a request is made to the MFD for a video stream or at the outbound side when a specific video stream is heading out for delivery.

The server side player 201 interprets a URL received from the output protocol engine 210, decides what bit rate is to be used for the requested video content, handles what is to be sent, and where to play the video from (what frame within the video to start streaming from). The server side player 201 is bit rate aware and knows the bit rate of the video content that it is trying to serve. It can use information obtained from the optimized network stack 211 to find out what the effective bandwidth is for the client in the last mile. The server side player 201 can also authorize the request. In a possible embodiment, a signed hash key embedded as a query string in the URL is used to verify that the request is authorized.

The server side player 201 provides an assured bit rate and quality of service (QoS) feature. If the client has to buffer, then it means that the MFD has fallen behind in its delivery rate and the client has experienced a dead period where there is no content to play or display. In one possible embodiment, the server side player 201 calculates how much data has been sent to the client and how much time has passed. The server side player 201 tracks the amount of data sent to each client and the bit rate of the video content that each client is being sent. As each client is sent an amount of data, the server side player 201 records the amount of data that was sent and the amount of time that has passed since the last amount of data was sent. Alternatively, the server side player 201 can record the total amount of data sent to the client and the total amount of time that has passed during the client's session. Using the recorded information, the server side player 201 can calculate if it has fallen behind in its delivery to a particular client. For example, if the server side player 201 has sent 30 seconds of data at a certain bit rate to the client and 31 seconds have elapsed since the last transmission of data, the server side player 201 knows that it has fallen behind.

In another possible embodiment, the server side player 201 calculates how much more data it needs to deliver to the client and the time window that the data must be delivered in to avoid buffering on the client side. This calculation is slightly different than the previous example. The server side player 201 knows the size of the video file and thus can calculate the amount of data that remains to be sent to the client. It can also calculate the amount of time it has to deliver the remaining amount of data given the bit rate and the total size of the video file. The server side player 201 can calculate the deadline that it needs to set for a task that it creates to deliver a segment of the video file to the client.

The MFD is a task-based system that can use deadline-based scheduling. The server side player 201 sets up deadlines in the tasks that it creates in order to avoid client buffering.

In a possible embodiment, the server side player 201 calculates an assured flow rate (AFR) value (described below). The AFR is the transmission rate required to ensure a smooth viewing experience. The server side player 201 uses the AFR value to set deadlines for tasks that it creates for requesting data from the buffer manager 203. The server side player 201 calculates the AFR and the output protocol engine 210 manages the transmission rate on each connection based on the AFR and sets the task deadlines such that the AFR can be met. In the example above, the server side player 201 tries to stay ahead of the AFR and would know that it has fallen behind if, for example, the server side player 201 has sent 30 seconds of data and 30 seconds have elapsed since the last transmission, the server side player 201 immediately knows that it has fallen behind. In an alternative embodiment, the server side player 201 can scan a media file to set an AFR for the media file. The server side player 201 knows that a certain quality or resolution of the media file requires a certain transmission rate in order to ensure that the client will not stall.

The server side player 201 also handles scrubbing requests (in order to decide what to do in the future), transcoding, and ad insertion. The server side player 201 is video-aware as opposed to a typical file server that does not know what the video file format or video content is. When the server side player 201 changes the bit rate after the video has started, the server side player 201 already knows where the associated frame exists in the different bit rate version, so the server side player 201 can easily change bit rates without the client having to send a different offset for the new bit rate. A possible embodiment stores video content in a custom format that can be transcoded to any bit rate that it requires. This allows the server side player 201 to know exactly where the associated frame is for each bit rate transcoding. Another possible embodiment stores several different bit rate versions for a specific video content. The server side player 201 stores index tables for each of the bit rate versions so the server side player 201 can quickly refer to a table to find the associated frame for the new bit rate video.

The server side player 201 can perform advertisement insertion into the video streams. Ads can be placed in the video stream as overlays. This makes the ad insertion independent of the client player. The content can be dynamically created, e.g., subtitle language selection can be made on the fly and the appropriate subtitles can be overlaid on the fly. The server side player 201 can splice an ad into the middle of a video (referred to as mid-roll). The server side player 201 can also overwrite the voice channel of a video with another channel to provide multiple language support without having to store different versions of the video content.

In a possible embodiment, the server side player 201 provides two interfaces, both of which are accessed by the HTTP protocol engine (HPE) in the input protocol engine 209:

northbound interface: This serves as the northbound interface where every incoming request parsed by the HPE is examined by the server side player 201 to validate the request with its customer specific logic. Once the request is examined and the necessary parameters are enforced, the request is sent back to the HPE so that it can make a valid request to the buffer manager 203 (and other providers thereafter) for the content.

southbound interface: This serves as the southbound interface where all outgoing data is sent to server side player 201 to be examined before delivery. This is the final place where the server side player 201 can enforce any restrictions before the content is sent out for delivery. The server side player 201 has the ability at this stage to modify the data buffers returned by the buffer manager 203 if required before sending it out.

Figure 7:
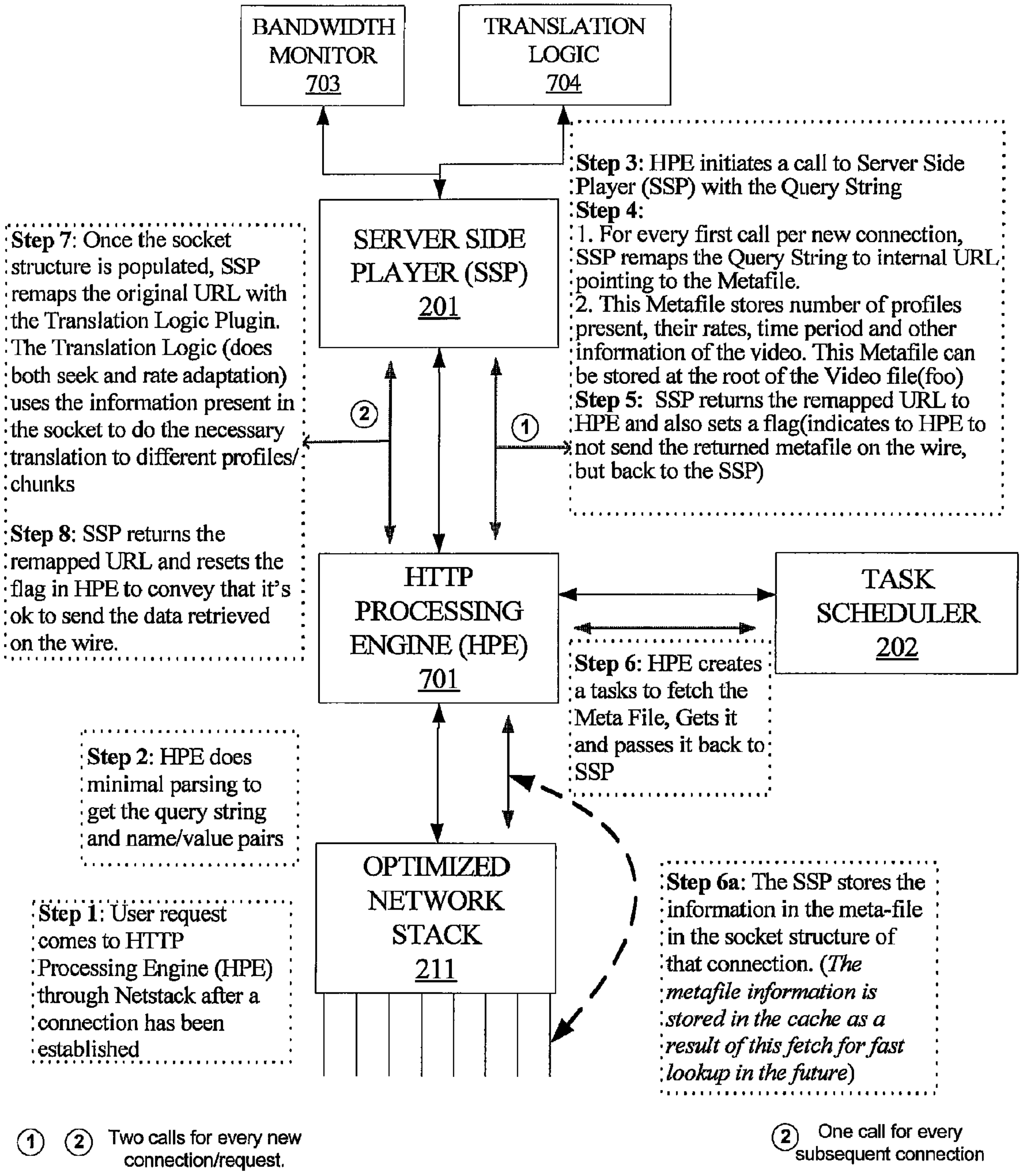
FIG. 7 illustrates flow diagram of the workflow between the HPE and the server side player, according to an embodiment of the invention.

FIG. 7 shows a possible embodiment of the workflow between the HPE and the server side player 201. The following steps are performed:

Step 1: User request comes to the HPE 701 through the optimized network stack 211 after a connection has been established.

Step 2: HPE 701 does minimal parsing to get the query string and name/value pairs.

Step 3: HPE 701 then initiates a call to the server side player 201 with the query string.

Step 3a: Server side player 201 may act as a pass through for files that are not related to video, but per se security access files, etc such as those requested by client players.

Step 4: For every first call per new connection, server side player 201 remaps the query string to an internal URL pointing to a metafile. This metafile stores the number of profiles present, their rates, time period, and other information of the video.

Step 5: Server side player 201 returns the remapped URL to HPE 701 and also sets a flag that indicates to HPE 701 to not send the returned metafile on the wire, but back to the server side player 201 for further processing.

Step 6: HPE 701 creates a task to fetch the metafile from cache. HPE 701 receives the metafile and passes it back to server side player 201.

Step 6a: The server side player 201 stores the information in the metafile in the socket structure for that connection. The metafile information is stored in the cache as a result of this fetch for fast lookup in the future.

Step 7: Once the socket structure is populated, server side player 201 can now remap the original URL with the translation logic plugin 704. The translation logic plugin 704 (does both seek and rate adaptation) uses the information present in the server side player 201 structure in the socket connection to do the necessary translation to different profiles/chunks.

Step 8: Server side player 201 returns the remapped URL and resets the flag in HPE 701 to convey that it is ok to fetch and send the data retrieved from the cache on the wire.

Step 9: The query string is passed to the server side player 201. Server side player 201 checks if the socket structure is already populated.

Step 10: If populated and if the name/value pair for time offset is not minimal (time offsets or byte offsets that denote a scrub or seek are present), then server side player 201 calls translation logic to remap to an appropriate URL and server side player 201 calls HPE 701 to fetch/pass data.

Step 11: If name/value pair in query string is minimal (no time offsets or byte offsets that denote a scrub or seek), then repeat from Step 4.

Scheduler 202

The scheduler 202 uses deadlines set by callers to organize scheduling of tasks. There can be hundreds of thousands of tasks in that the scheduler 202 is managing. It keeps the tasks organized by the deadlines. The scheduler 202 monitors the tasks to see if any tasks have missed their deadline. This tells the scheduler 202 that the MFD has fallen behind. It sends feedback to the server side player 201 to tell it that the delivery rate has fallen behind. The scheduler 202 can send information such as task ID and amount of time that the task missed the deadline.

In a possible embodiment, the scheduler 202 may refuse to accept a task for a new connection if it determines that it cannot meet the requested task's deadline. This is one component of admission control that ensures that MFD resources are not over-committed and existing connections play smoothly. Similarly, all components that implement tasks (e.g. buffer manager, disk manager and origin manager) can look at their internal resource commitments and fail the first task of a new connection as a way of refusing to accept the session.

The server side player 201 can identify which tasks are associated with each client. It can calculate, possibly using the above described calculations, how late it is in delivering video content to a client and adjust deadlines for subsequent tasks accordingly. The server side player 201 can then stop accepting new connections. In a possible embodiment, the server side player 201 can, possibly based on policy settings, lower the bit rate of some of the existing connections in order to accept additional connections. These approaches allow the server side player 201 to dynamically measure its performance and thus it does not need to set a static cap on the number of client connections. Given that it is handling many different bit rates, a static cap on the number of connections does not represent the actual capacity of the MFD, so a dynamic cap can be more efficient and allows the MFD to decide on its own whether it can handle more or less connections.

A possible embodiment performs deadline scheduling where each task state can have multiple deadline queues. Each deadline queue can correspond to fixed time periods, for example, 1/10 ms chunks. The scheduler 202 can pop the queue that has the shortest deadline.

Task handlers are pre-registered with the scheduler 202 at init time. They are always non-blocking. Blocking handlers are another set of threads and are described below. In a possible embodiment, any task switching does not involve a thread context switch.

Blocking tasks are given off to a pool of threads. Whenever there is a task to be completed, one thread from the thread pool services the task. The scheduler 202 at this point has handed off the blocking task. Hence, no other tasks will be blocked.

The scheduler checks relevant queues (state/deadline queues) in a WRR (Weighted Round Robin) fashion. It dispatches tasks by calling pre-registered task handlers. The scheduler 202 schedules according to a deadline by keeping track of elapsed time and popping relevant queues. The deadline scheduling is not strictly real time. The deadlines are a recommendation to the scheduler 202 that a particular task needs to be scheduled before another.

The scheduler 202 enables different types of threads. Threads are task threads, I/O threads, event threads, and network threads. These enumerated threads do not limit the number and types of threads that can be implemented. Task threads are the primary engines for task execution. The scheduler 202 is the start routine. It implements a dispatch look based on priority management. These threads block when there are no tasks to run.

I/O threads are used to implement blocking threads (e.g., disk I/O in the disk manager 206). They can block on read/write calls. Event threads are asynchronous and map network events to task state changes. Network threads implement the user space network stack and typically do not block on reads. Dedicated threads are used for scaling and management of timers for AFR. Alternatively, the network activity could be performed using tasks on the scheduler threads.

Disk Manager 206

Figure 8A:
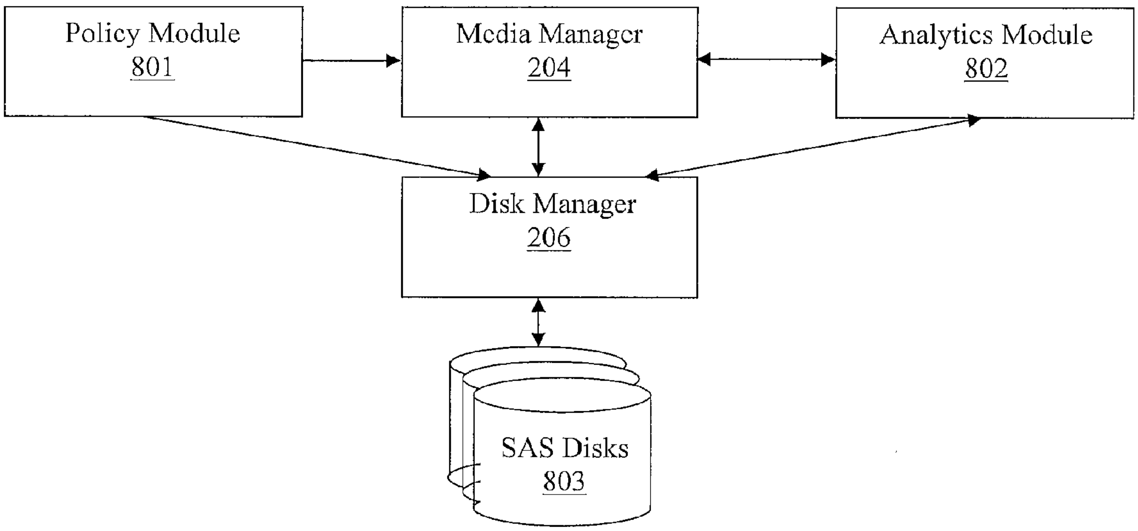
FIG. 8*a* illustrates the interaction between a disk manager and a policy module and an analytics module, according to an embodiment of the invention.

The disk manager 206 manages objects spread over multiple disk drives, regardless of size and count and type. Also referring to FIG. 8*a*, disk manager 206 obtains hints about object placement from the policy modules 801 (PM) and analytics module 802 (AM). The media manager 204 can interact with the PM 801 to help it decide how to apportion videos into segments and also to determine when a portion of a video is determined as hot (discussed below). The media manager 204 can also interact with the AM 802. The AM 802 determines which video portions are hot based on the statistical information covering video portion hits provided by the media manager 204.

Objects stored within disk manager 206 are most likely video related but can be anything. The disk layout of objects is particularly suited for video objects because they are consumed in a serial fashion. For small objects, disk manager 206 performs special packing so many sequential, small objects can be packed closely together in time sequence order. This works very well in the case where the small objects are chunked pieces of a larger video in time sequence. This packing allows disk manager 206 to optimize read performance of disk drives because the time it takes to read a small amount of data is about the same as the time it takes to read about 1-2 MB of data. In another embodiment, the disk manager 206 can allow for multiple strategies for packing objects. In addition to time based locality, it can also support packing based on locality within the name structure or other custom schemes.

Figure 8B:
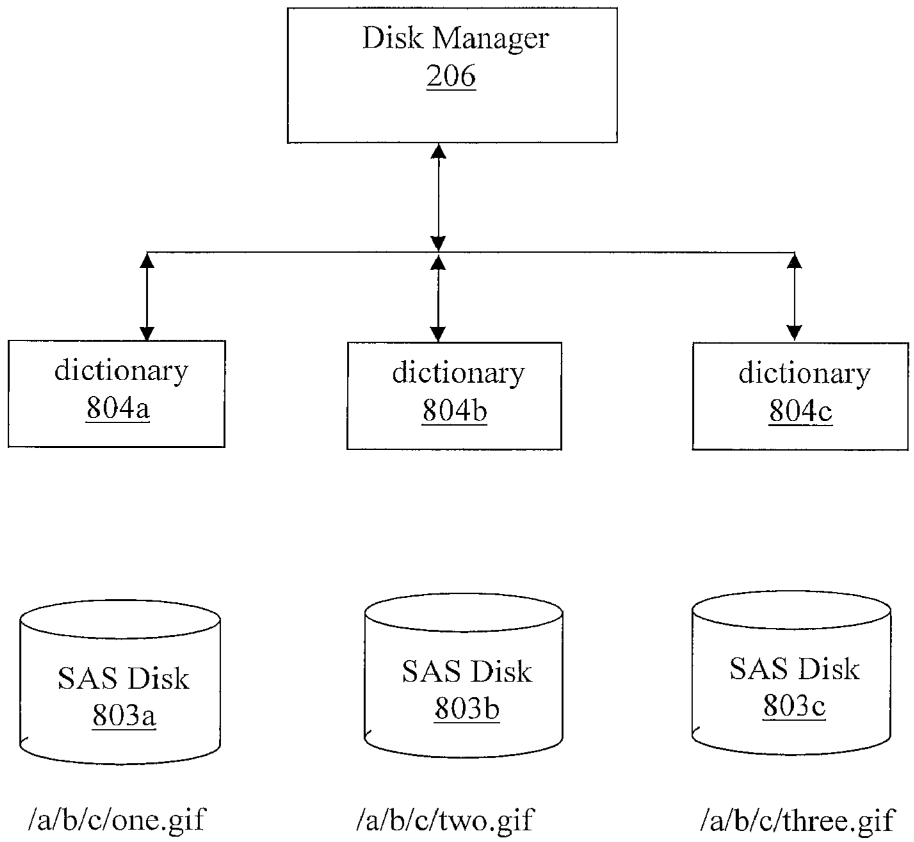
FIG. 8*b* illustrates the interaction between a disk manager and dictionaries for storage devices, according to an embodiment of the invention.
Figure 8C:
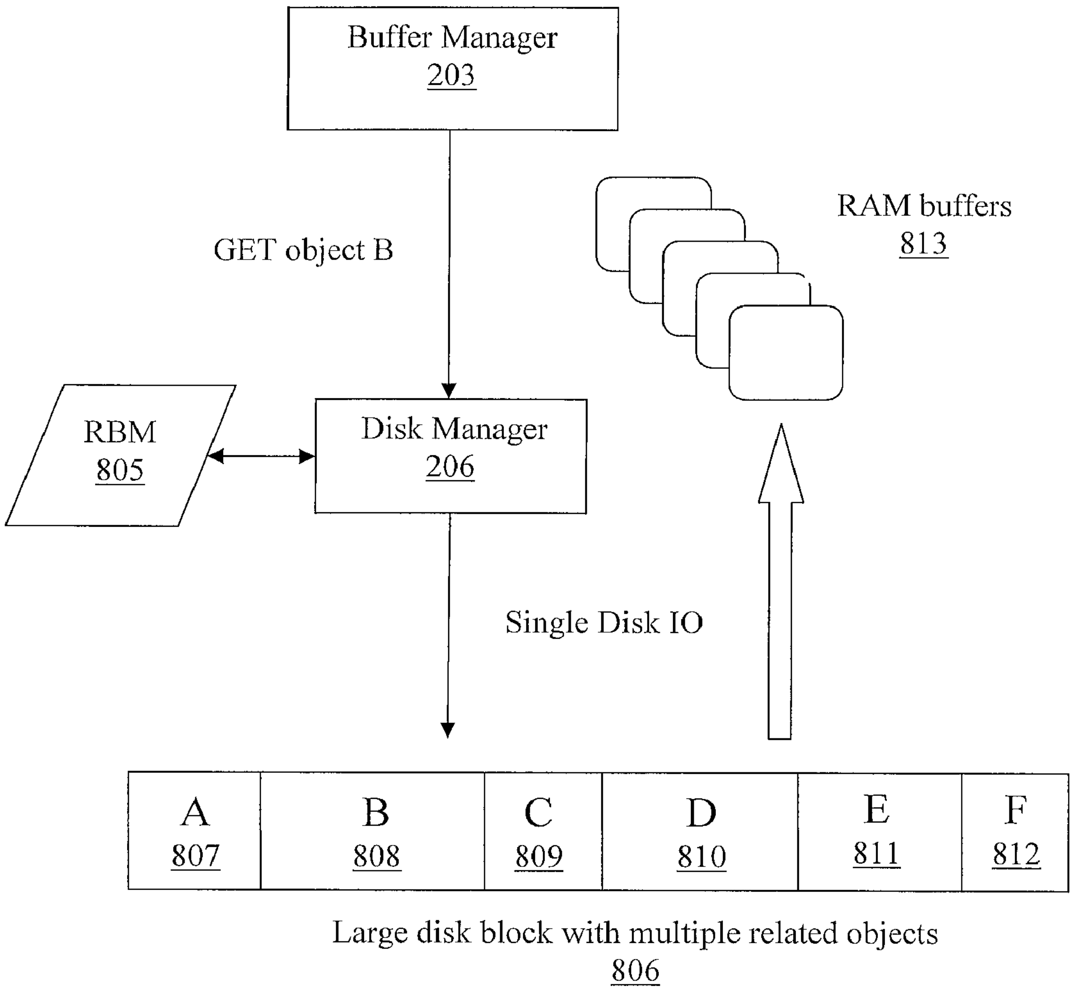
FIG. 8*c* illustrates the interaction between a disk manager and a reverse block map, according to an embodiment of the invention.

Referring also to FIG. 8*c*, the disk manager 206 can use a reverse block map (RBM) 805 in order to consistently read large blocks 806 (even in the presence of small objects). The block sizes are set to a specific size that allows for efficient reads from the disk drives, e.g., 1 MB, 2 MB, etc. For each block, the disk manager 206 keeps a list of extents in the RBM 805, where each extent is a contiguous portion of an object. In this example, the RBM 805 lists block 806 with related extents 807-812. Note that for smaller objects, multiple small objects themselves or portions of the smaller objects may fit into a block and may be read into cache memory together. When the disk manager 206 receives a request for a specific portion of the object, it locates the block where the specific portion resides. It then reads the entire block into cache memory 813 supplied by the buffer manager 203. Using the RBM 805, the disk manager 206 is able to assign the correct identity (UOL) to each buffer (as described below). This allows the buffer manager 203 to subsequently consume the additional data without doing any additional IO. In an embodiment, the disk manager 206 creates entries in the RBM for all of the objects stored in the MDF. The disk manager 206 may create an entry in the RBM for an object when the object is loaded from an origin server.

The disk manager 206 accounts for many types of disk controllers and disk drives, including SATA, SAS, SSD and flash. Each drive type has different size and performance characteristics. As such, the disk manager 206 will vary the data layout for each drive type to allow optimal performance and utilization of disk space. In order to self-tune for variances in drive types and controllers, the disk manager 206 performs a brief bandwidth test on startup, so it can categorize the large number of configurations that it sees within an open hardware framework.

An administrator can configure the disk manager 206 to store content from an origin server onto the hard drive or in a cache. The administrator can specify that the disk manager 206 store the content on the first hit or any specific number of hits before the disk manager 206 stores the content on the hard drive or cache. This allows the administrator the flexibility to adjust the cached content to any known or predicted demands. Alternatively, how the disk manager 206 stores the content can be driven by internal analytics. The administrator can instruct the disk manager 206 to store specific new content on the hard drive because, for example, he knows that new episodes of a show will be in demand.

Eviction policies are enforced by the disk manager 206. Content can be removed from the hard drive or cache in order to make room for new content based on eviction policies defined by an administrator or customer. In a possible embodiment, eviction policies can be internally derived based on analytical algorithms, e.g., using a least recently used (LRU) algorithm or its derivatives. The customer can install enough storage capacity in the MFD such that the storage space may never be filled by the customer's content. The customer may desire to have its content in the fastest areas of the hard drives and sparsely populate the hard drives in order to accomplish this goal. The customer can then have a set of MFDs dedicated to their hottest content with sparsely populated hard drives and have another set of MFDs caching their less-popular content. The administrator can specify that certain hard drives on a MFD are kept sparsely populated with the hottest content and other hard drives on the MFD are used for all other content. This allows a customer to implement an efficient storage scheme for a particular MFD.

Referring also to FIG. 8*b*, the disk manager 206 treats each device as an independent cache module. The meta-data and data on each device comprise a separate and independent store, similar to a filesystem. However, the naming hierarchy is common across all modules, unlike a traditional filesystem, where a given name is bound to a logical device (filesystem). For example, if a traditional filesystem were mounted at /a/b/c, then all objects under that directory would be located in that filesystem. By contrast, the disk manager 206 is able to store /a/b/c/one.gif, /a/b/c/two.gif, and /a/b/c/three.gif in any of the cache devices 803*a*, 803*b*, 803*c*, it manages. During initial placement (as well as relocation for load balancing), the disk manager 206 selects the device to store the object based on usage statistics it keeps on a per device basis. During lookup (to serve the STAT task), the disk manager 206 determines which devices have the object and selects one, again based on usage statistics. This allows objects, or portions thereof, to be placed and served from any cache module independent of its name. The disk manager 206 is able to optimize the bandwidth from each device by placing objects (and relocating them dynamically) based on usage statistics. In an embodiment, the disk manager 206 keeps track of per device traffic in terms of read and write throughput for each device. During initial placement and relocation, it chooses the device with the least amount of traffic. In another embodiment, it uses the queue depth (number of outstanding requests) and average latency as the measure of traffic. The flexible placement results in linear scaling across cache devices.

In an embodiment, the disk manager 206 caches the dictionary 804*a*, 804*b*, 804*c*, for each cache device 803*a*, 803*b*, 803*c*, in RAM. The dictionary 804*a*, 804*b*, 804*c*, consists of the tree of objects stored in that device 803*a*, 803*b*, 803*c*, along with a small amount of metadata about the object. This allows the disk manager 206 to answer the STAT query very efficiently and without incurring any disk IO.

The disk manager 206 provides a simple fault recovery model. The failure of a single cache device just results in the loss of the objects contained in that cache device. It has no impact on the performance of the other cache devices. The failed cache device can be replaced (online, for a hardware system that supports hot swapping) and reconfigured as a new cache module. In an embodiment, the disk manager 206 can also selectively replicate objects in multiple cache devices in order to get better fault recovery and performance.

In an embodiment, all information about videos is self-contained within each drive such that drives can be moved between MFDs. Over time, disk manager 206 queries the analytics module 802 to atomically move entire movies or clips between drives and/or to inner or outer tracks in drives in the SAS disks 803. Disk manager 206 provides data necessary for the media manager 204 to promote and demote objects between various layers within the cache hierarchy. Initial placement of content can be dependent on data from the analytics module 802 and/or the policy module 801. The disk manager 206 chooses the data layout that optimizes read performance, even for small objects.

The disk manager 206 can avoid fragmentation problems that affect performance for most filesystems. It does so by reclaiming entire blocks whenever a configurable amount of space has been freed in that block. For example, if a 2 MB block is filled with 64 objects of 32 KB each and half the objects are deleted, e.g., based on eviction, the disk manager 206 can free the entire block. The RBM is used by the disk manager 206 to logically delete or relocate the remaining objects.

Video information can include: compressed/uncompressed video data, video attributes needed by an application (header information), and video attributes needed to aid internal operation (cache expiry, cache initial time). The disk manager 206 readjusts cache contents as drives are removed and added. It also gracefully handles runtime errors from the physical media. SAS, SATA, SSD, and flash drives are supported together on the same system. The disk manager 206 allows high levels of parallelism to multiple drives. A possible embodiment allows pre-loading of the cache with media which is can be served until a specific date and/or time.

Intelligent Caching

Hard drives typically do not operate well as caches, when a hard drive is used as a cache and it is caching hundreds, thousands, or even tens of thousands of videos, the end result is a random input/output (IO) pattern. The MFD places interesting content in the same area of the hard drive so the MFD can perform large reads to compensate for bandwidth, e.g., for a low bandwidth connection, the MFD can read 30 seconds of video in one read and store it in the cache in the RAM or SSD (or buffered on the hard drive depending on the number of connections being served and bandwidth considerations of those connections). This allows the client to be served out of that cache and the client does not need its next IO for 30 seconds. The SSD is used for content that is accessed more frequently or for content that requires smaller random IOs that cannot be efficiently served from the hard drive. A popularity index is used for portions of content to determine whether a portion is hot. For videos, people may not be watching the entire video and some portions of a video may be hotter than others, so the hottest portion of a content is cached. This allows the MFD to be more intelligent in its caching. The MFD does not have to cache an entire video stream, for example. The MFD dynamically computes the popularity of portions of content.

Figure 3:
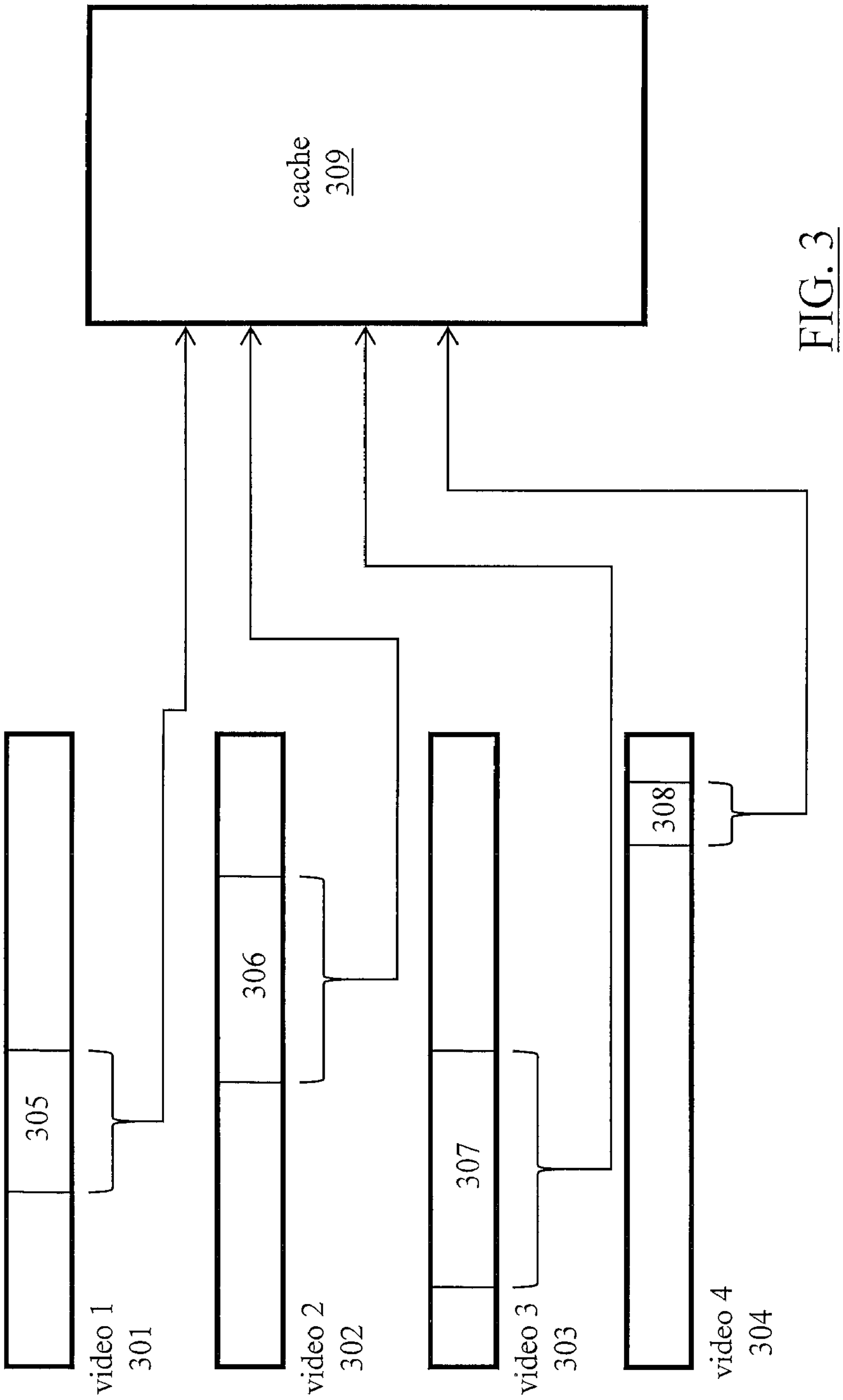
FIG. 3 illustrates an example of dynamically determining the popularity of portions of content, according to an embodiment of the invention.

Referring to FIG. 3, the boundaries of the hot portions of video are determined dynamically as the MFD measures accesses of a video stream. In a possible embodiment, the server side player 201 uses a logical chunking approach to dynamically determine where the hot portion of the video is. For example, the server side player 201 may use frame identifiers such as time tags embedded in the video frames or storage memory address locations. The frame identifiers may be obtained by the server side player 201 using a table of offsets created for the video stream. The table of offsets may be created by the system upon receipt of the video stream or created by a content provider which is loaded into the system at the time the video stream is received. Multiple tables may be stored for different bit rates of the video stream.

The server side player 201 can determine the portion or boundaries of the video stream that covers the most viewed frames of the video stream and places the hot portion of the video stream into one of the caches (hard drive, SSD, or RAM). In a possible embodiment, the analytics module monitors video 1 301, video 2, 302, video 3, 303, and video 4 404. It finds that there are sections of the videos that are viewed more frequently than other parts of the videos or other videos by client systems. Those portions of the videos 305, 306, 307, 308, are stored in the cache 309. The cache 309 may be any of the caches, RAM cache, SSD cache, or hard drive cache, or any combination thereof.

In a possible embodiment, the server side player 201 supports physical chunking of a stored video stream that partitions the video stream into small files and determines which file is popular. Physical chunking splits the video into small named chunks that are visible to the client player.

Time-based access patterns are used to determine which videos tend to be watched together, e.g., subject-related news items or content-related videos, and the disk manager 206 co-locates the hot portions of the videos in the same area in the hard drive cache, SSD cache or RAM cache, thereby increasing cache hits and allowing for faster access times.

The RAM cache is integrated with the buffer manager 203. It uses analytics and/or policies to manage the RAM cache and select eviction candidates. As the server side player 201 finds each hot video portion, the buffer manager 203 determines which hot portions already stored in the cache are no longer determined to be hot. The buffer manager 203 removes portions that are no longer hot from the caches in order to make room for new hot portions. This is done by the buffer manager 203 based on internal analytics derived from access patterns. In an embodiment, the buffer manager 203 keeps all buffers that are not in active use organized by eviction order. The ordering takes into account factors like the number of times the buffer was accessed, the time frequency of accesses, and the increasing/decreasing rate of use.

The buffer manager 203 can use main memory (RAM) as a cache for high-bit rate videos and SSD memory for low-bit rate videos. This allows the MFD to more efficiently use the main memory.

The media manager 204 manages the cache hierarchy (e.g., SSD, hard disk, peer). It looks at analytics and/or policies to determine when to promote, demote, or evict cache contents. The media manager 204 initiates the hierarchical cache management which includes cache promotion and demotion actions. The implementation for each element in the cache hierarchy is called a cache provider. Providers are dynamically registered and assembled into a hierarchy based on the properties that they register, e.g., bandwidth, latency, capacity, etc. There are two classes of providers: cache providers that are local caches to the system that support reads and writes; and origin providers that are networked sources that supply origin content and are read-only. The units of cache migration can incorporate the logical chunk boundaries or in some cases be purely derived from device level block management. For example, in the HDD, popular blocks (that may contain portions of multiple videos) can be promoted to SSD or to the outer tracks of the HDD.

Metadata describes where media is stored among the disks. Most operating systems cache information about files. The information is called an inode. An inode cache can hold many inodes, typically on the order of millions. This cache will consume precious memory which the MFD could use to cache media data. The MFD has information to tell it where various pieces of media data are stored within the raw partition of a disk. This information falls under metadata and is called an "extent". Each disk block which holds a large media object can have a single extent to refer to that data. When a disk block holds multiple small objects, each small object has a separate extent to describe it.

In order to reduce the inode cache space which is hard to control in some systems, the metadata is packed, including extents, into single inodes/files called containers. Each container holds the extents for a set of objects that are common. Because the objects are common the MFD would have normally read the metadata for these objects.

In a possible embodiment, the MFD creates a dynamic disk hierarchy that allows the MFD to determine the bandwidth of the disks within the MFD. The disk manager 206 determines which drives are possible cache targets. It runs a short test to categorize each drive according to disk bandwidth. This is done because the same type of drive can see different performance numbers depending on which disk controller is in front of it. By running a disk test, the disk manager 206 does not need to distinguish between various drive types or figure out what performance each disk controller can deliver. The drive/controller bandwidth combination will place the pair within some category set by the factory or by an administrator. There typically are a preset number of categories.

In a possible embodiment, the MFD creates a disk cache hierarchy. Each level of the cache hierarchy contains a set of objects. Objects near the top in terms of number of accesses are good candidates to move into the next fastest hierarchy, thereby enabling a decrease in total access time for all objects. Movement of an object from a lower level to a higher level can be determined using the bandwidth usage and the space usage to determine when it is appropriate to move the object. Objects near the bottom in terms of number of accesses are good candidates to move into the next slowest hierarchy, freeing up room for higher access count objects. The MFD attempts to maximize the available bandwidth for the highest level to the lowest level. For example, three levels, A, B, and C, are defined, with A being the fastest cache. If A is not full, then it would make sense to promote the highest accessed objects in B to A. This would leave more room to promote objects from C to B. If some objects in B are accessed less frequently than objects in C, then it would make sense to demote the least accessed objects in B by moving them from B into C and the promote the most accessed objects of C into B. This movement process is called "promotion" and "demotion".

The outer 10-15% of each disk drive can deliver 15-20% better performance than the random performance of an entire drive. A possible embodiment can carve out the outer part of a drive and migrate the hottest parts of media objects to this area.

Buffer Manager 203

The buffer manager 203 provides the primary data path within the MFD. All content served by the MFD are sent via buffers. Buffers are used both for speed matching (buffering) between the outbound network and the cache providers as well as a RAM cache. The latter is the (implicit) first level in the cache hierarchy. When requested content is not available in the cache, the buffer manager 203 uses the services of the media manager 204 to retrieve that data and cache it for subsequent requests if possible.

The buffer manager 203 receives a request for content from a task that the HPE creates. The buffer manager 203 fetches content. Given a URL and an offset to play from, it will supply the content. The buffer manager 203 retrieves the content from media manager 204. The buffer manager 204 creates a task to retrieve a portion of the video content starting at the offset. The media manger 204 retrieves the content form the hard drive or SSD. The buffer manager 203 can check if the requested content matches any content stored in the main memory cache (RAM). The RAM cache is composed of a plurality of buffers. A hit can be directly served from the cache without any further copying. A miss is served by filling a new buffer using the media manager 204 to locate the content in storage. The buffer manager 203 passes a pointer to the buffer containing the portion of video content to the output protocol engine 210 which streams the portion of video content to a client.

The buffer manager 203 efficiently manages a large amount of memory. It has the ability to share buffers across connections that are serving the same content. The buffer manager 203 also has an efficient re-use scheme derived from the usage pattern in the MFD.

The buffer manager 203 handles buffer eviction based on a cost function that is calculated based on the use count and age. A higher use count results in a higher cost, whereas the age acts as a decay function on the cost, e.g., older buffers have a lower cost. The eviction algorithm attempts to approximate finding the lowest cost buffer while operating very efficiently (constant time).

A buffer that can be evicted (has a zero reference count) is inserted at the tail of an LRU list. The lists are ordered by the use count of the buffers. Each LRU list is effectively ordered by timestamp. A buffer that is not in the cache (e.g. expired, purged) is put on the head of the lowest LRU list with a zero timestamp.

During the eviction, the cost is computed for the head of each LRU list and the lowest cost buffer is evicted.

Each object (URI) has an expiry time that is part of the attributes. On access in the buffer cache, the expiry time is checked against the current time. If expired, all the buffers and the attributes associated with the object are removed from the cache. The buffers are put on the LRU lists when the reference count becomes zero. An object can be revalidated with the origin server during a time window (that can be configured by the administrator or user) prior to the expiry time.

Figure 9:
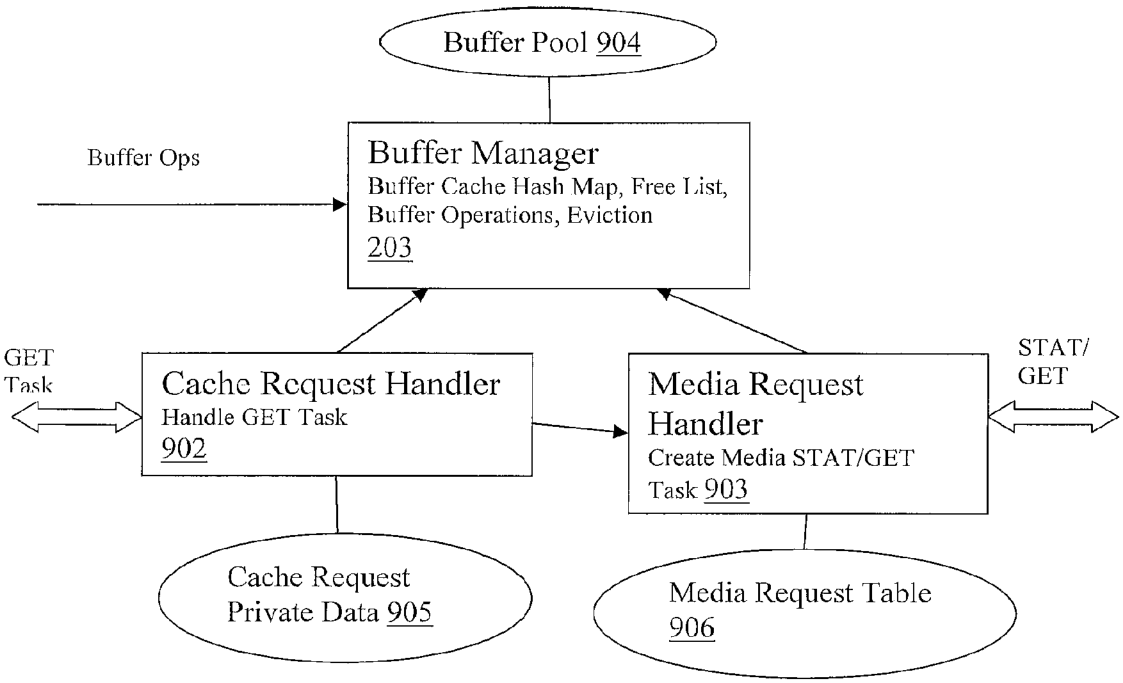
FIG. 9 illustrates the interaction between a buffer pool and buffer manager, according to an embodiment of the invention.

Referring to FIG. 9, in a possible embodiment, the buffer manager 203 manages the buffer pool 904. The memory available for data is statically divided into an array of fixed size pages. Each page has a corresponding buffer structure to encapsulate the metadata associated with a buffer. The buffer structures are also statically allocated from an array. Each buffer can be linked via the buffer cache and the free list. Some of the elements of the metadata are:

Identity. The identity of the buffer. Data buffers have an ID consisting of the UOL (URI, Offset and Length). Attribute buffers have an ID of URI only.

Reference Count. The number of active users of the buffer.

Use Count. The number of times the buffer has been used. This is the basic measure of the buffers "popularity".

Timestamp. The time at which the buffer is put on the LRU list (i.e. reference count is zero).

The buffer manager 203 manages the buffer cache. A hash map using the UOL as the key is maintained for all buffers that have an identity and can be shared with other connections. A possible embodiment supports a non-cached mode for a buffer whereby it has an identity, but is not shareable.

Data buffers associated with the same object (URI) are linked together with a list rooted in the corresponding attribute buffer. This allows fast application of actions that pertain to the entire object (e.g., cache expiry and object purge).

A free list is also maintained by the buffer manager 203. All buffers, including those with an identity, that have a zero reference count are on this list. This allows for efficient eviction of buffers as needed. The list can be composed of multiple lists ordered by the use count of the buffers.

Each GET task allocates some private data in the cache request private data 905 that is used to keep a list of its buffers for reference counting. It is also used to link to an underlying media request. The cache request handler 902 manages the cache request private data 905 and handles the GET task requests.

The media request handler 903 captures the in/out arguments for each media GET task sent to the media manager 204. Media Request objects are linked into a media request table 906 so that multiple requests to the same, or co-stored, objects can be synchronized.

Figure 10A:
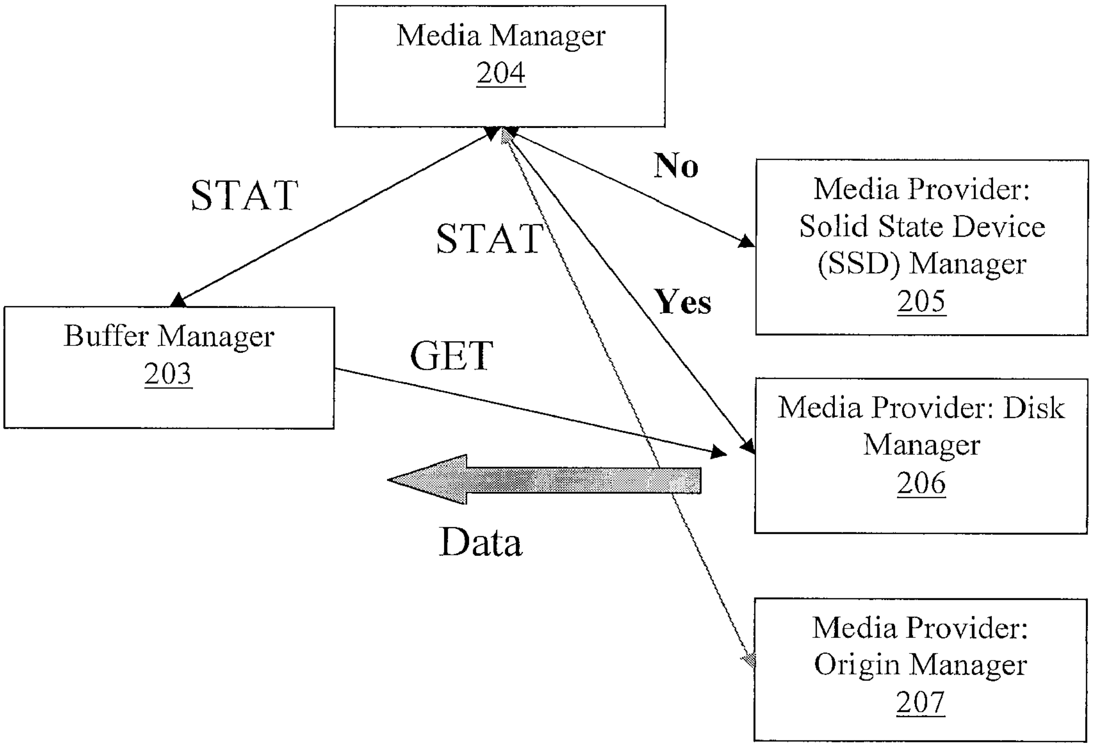
FIG. 10*a* illustrates the interaction between a media manager, buffer manager, and media providers, according to an embodiment of the invention.

Referring to FIG. 10*a*, the interface between buffer manager 203 and the media manager 204 (which implements the cache hierarchy) has unique characteristics that enable the high performance caching system. The selection of the device that provides the data is done using a STAT task that acts like a bidding system. Each layer in the cache hierarchy, e.g., solid state device (SSD) manager 205, disk manager 206, and origin manager 207, can respond, in turn, to bid for serving the request. The bid includes a "blocksize" that tells buffer manager 203 to allocate the requisite set of buffers. The buffer manager 203 then sends down a GET request to the specific cache provider that won the bid. The request and response are logically decoupled. The provider fills the supplied buffers with content and sets the appropriate identity for each buffer. This results in the new buffers being inserted into the RAM cache. Upon completion of the task, buffer manager 203 looks up the RAM cache again and is able to find the buffers it was looking for. This model allows the providers to supply additional data, either subsequent portions of the same object or other related objects, in the same request. It also allows various portions of an object to be supplied by different providers. Naming and location are orthogonal. For example, a video object with a name /a/b/c/one.flv can exist (in parts or whole) in any of providers in the cache hierarchy.

Media Manager 204

The media manager 204 promotes and demotes videos based on the relative hotness of the video. The hotness of the video is a function of the number of hits on that video, the frequency of hits, and the increasing or decreasing trend of the frequency.

The media manager 204 has n different sources, the SSD(s) 205, hard disk(s) 206, origin server 207, or peer 208. It receives a buffer and fills it with a portion of the requested content. The media manager 204 sends the filled buffer to the buffer manager 203. If the content is not in local storage the media manager 204 retrieves the content from the origin server, a peer, or a client. The following is the hierarchy of speeds, in a possible embodiment, associated with each source:

1. Memory (RAM): 10 Gbps
2. Flash: 4 Gbps
3. Solid State Device (SSD): 1.6 Gbps
4. Disk (SAS): 550 Mbps
5. Disk (SATA)—400 Mbps 6. Others
7. NFS and other file caches.
8. Origin Manager.

Figure 10B:
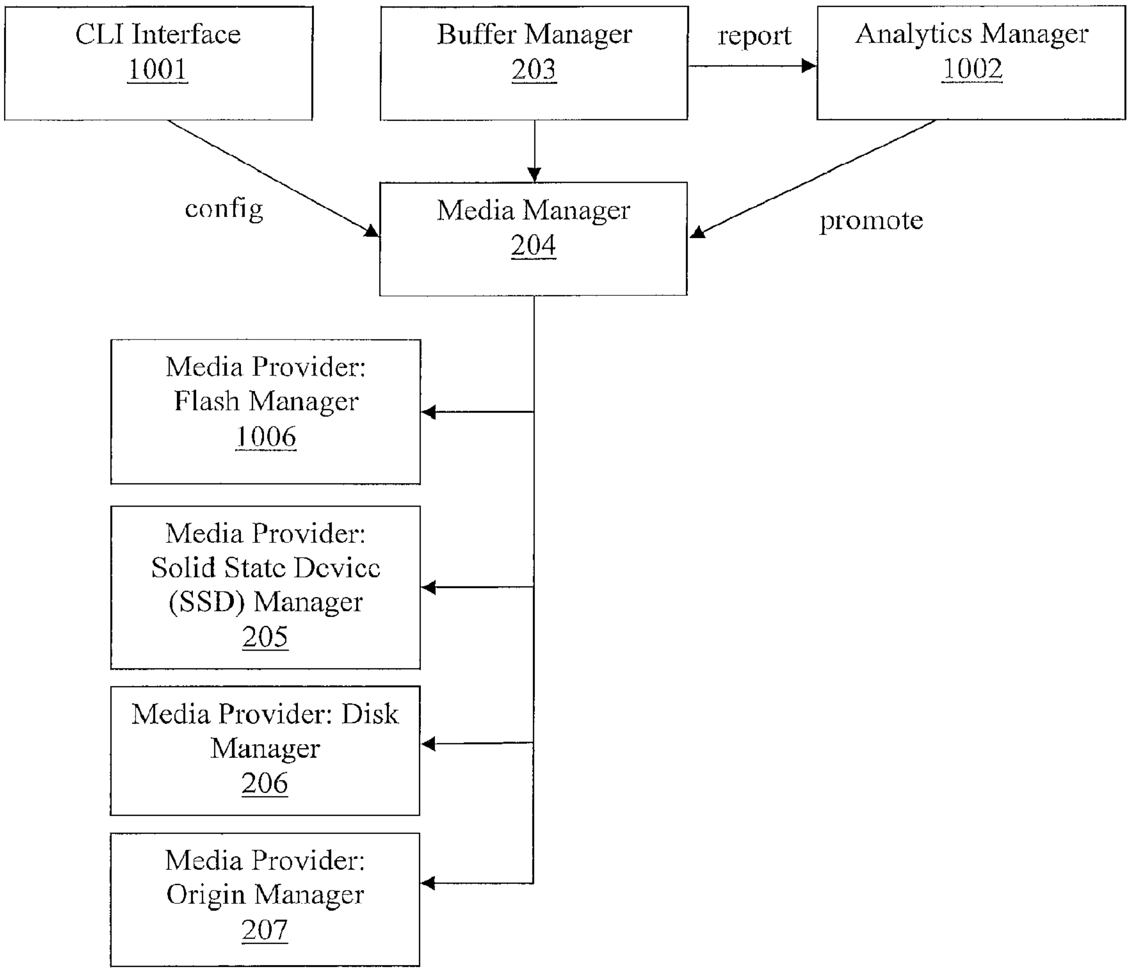
FIG. 10*b* illustrates the interaction between a media manager and analytics module for determining hot video segments, according to an embodiment of the invention.

Referring to FIG. 10*b*, the media manager 204 first places a new video in the lowest memory hierarchy. On a timer expiry, the media manager 204 checks the analytics/policies manager 1002 for the hottest and the coldest video. The analytics/policies manager 1002 provides the media manager 204 with the hottest videos and/or portions of videos accessed. The hottest video or portion of video is promoted to the next memory cache in the hierarchy and the coldest one is demoted to the next lowest in the hierarchy. In this way, a video can be placed in the lowest tier of a cache hierarchy and can bubble to the top of the hierarchy if its hotness increases relative to other videos.

The media manager 204 drives the eviction of videos from the respective caches. It implements an eviction timer. When the timer fires, the media manager 204 goes through each cache provider 205, 206, 207, 1006, checking whether the cache is full to a certain threshold. If a particular cache is full, the media manager 204 calls the eviction functionality of the provider. The provider then performs its specific algorithms for eviction.

Peer Manager 207

The peer manager 207 can be configured to obtain certain content from a peer MFD upon a cache miss. Given that a MFD has a limited amount of storage space in local storage such as one or more hard drives and one or more SSDs, a scenario may exist where a customer has more video content than a single MFD can store. The customer's video content can be distributed among a plurality of peer MFDs installed at the customer's site or, where the peer MFDs are accessible to each other over a network such as an intranet, Internet, LAN, or WAN, distributed among the plurality of peer MFDs that are in communication with each other.

An administrator can inform each peer MFD of the IP addresses of its peers so a peer MFD is able to communicate with its peers. If the peer MFDs are locally attached, they can discover their peers by themselves through any type of discovery mechanism. The peer MFDs can communicate among themselves and let each peer MFD know what URLs it caches. This means that after each peer MFD has loaded content from an origin server or another peer MFD, it informs each of its peer MFDs about the URLs that it serves. This can be via a message or series of messages sent to each peer MFD or broadcasted to all peer MFDs. If a request for a specific URL is sent to a peer MFD that causes a cache miss, the peer mgr in that MFD can request the URL content from a peer MFD that caches that specific URL.

Origin Manager 208

The origin server may push content to the origin manager 208 or the origin manager 208 may pull content from the origin server. The origin server may push content to the origin manager 208 by pre-staging the content to the origin manager 208. The origin server can FTP or HTTP into the origin manager 208 and tell the origin manager 208 to cache certain URLs because the content provider knows that the content will be hot.

The origin manager 208 pulls content from the origin server as a result of a client request that misses all locally available caches (also a proxy function). Pulling content can also occur due to a policy or command driven action to fetch content separately from a client request. The proxy function is separate from the cache ingestion. There are several reasons for this: (a) the proxy may have to serve oddly aligned byte range requests that are not convenient for caching; (b) the system may need to perform processing functions like chunking and transcoding during ingest (these are difficult to do in real time in the proxy); and (c) different policies for the two functions.

Input Protocol Engine 209

The input protocol engine 209 operates in the same manner as the output protocol engine 210, except that it communicates with origin servers using protocols such as HTTP, FTP or NFS.

Optimized Network Stack 211

The optimized network stack 211 uses the round trip time (RTT) in the TCP stack to estimate the last mile bit rate variation to the client. The RTT time tells the optimized network stack 211 if there is congestion down the line. The RTT provides an estimate of bandwidth available in the network going to the client. The optimized network stack 211 also implements error handling and congestion control using algorithms suitable for time sensitive applications such as video. The MFD can change the bit rate in response to the detected bit rate changes without the client knowing.

Assured Flow Rate

In a possible embodiment, the MFD has the ability to guarantee a certain class of service to every flow admitted into the system for data delivery. This is called the assured flow rate. The MFD calculates the assured flow rate for each session and sets up a maximum bandwidth for the session. The bandwidth usage for the session should be no less than the assured flow rate and should attempt to reach maximum bandwidth if there is bandwidth available.

The MFD implements flow control to ensure that existing sessions get the required rate and no more than the maximum. This is achieved in the network socket level. The socket level manages the data send rate. The session bandwidth queue and server timer are used for calculating flow control.

The MFD performs admission control and connection management by ensuring that a new session is not admitted if the server does not have enough resources to accept the connection.

Four metrics can be used for the MFD to maintain the assured flow rate (AFR):

$\Sigma$ AFR of all connections≤Appliance Interface port Bandwidth

Session AFR≤Client Session Bandwidth $\Sigma$ AFR of all connections≤(Disk+Buffer) Read speed Poorest Quality video bit rate≤Session AFR≤Highest Quality video bit rate Where:

Session: A single TCP connection.

$\Sigma$ AFR of all connections: Sum of AFR of all accepted sessions.

Session AFR: Individual AFR for one single session.

Client Session Bandwidth: The client session maximum bandwidth. Typically the client session maximum bandwidth refers to the max TCP throughput due to the limitation of the WAN environment. For a DSL download, the typical bandwidth is 1,500 Kbits/sec.

Video bit rate: Each video has a profile. Different profiles have a different quality. Higher quality videos require a higher bit rate. Not every video has a profile for all bit rates. A typical video profile bit rate could range from 200 Kbits/sec to 1,000 Kbits/sec.

To ensure that the MFD does not over commit server resources so that the AFR for existing sessions can be maintained, the MFD either rejects a new session or lowers the profile (if possible) for existing sessions to accommodate the new session based on a policy setting. A session is rejected by sending over a server busy HTTP reply or by simply closing the connection. The MFD does not close sessions in the middle of serving data. It simply lowers the video profile.

For example, if the total appliance network bandwidth is limited to 1 Gbits/sec for each network interface port, then the Σ AFR of all sessions should be less than this bandwidth. When the sum of the AFR of all of the accepted sessions is equal to 1 Gbits/sec, the MFD can stop accepting new sessions. In a possible embodiment, by considering the network overhead used by packet retransmission, ACK packet, TCP/IP header, other usages such as ARP, the off-line origin manager 208, etc., the bandwidth can be reduced to 0.8 Gbits/sec for all session AFR calculations in order to take in to account a more realistic bandwidth limitation.

The AFR bit rate can be between the poorest quality video bit rate and highest quality video bit rate. If the AFR<poorest quality video bit rate, then screen jitter will occur at the client side. If the AFR>highest quality video bit rate, then bandwidth resources are being wasted. The server side player 201 does not close a continuous session GET request but is allowed to close a new session by returning a failure error code.

In a possible embodiment, if a client is gaining access via a dial-in modem, the AFR is limited by this slow last mile connection. The network driver module detects the client connection ISP speed based on RTT calculation. An example equation can be: client session bandwidth speed=1460 bytes / RTT in seconds.

As discussed above, video content is stored in the disk or RAM. Once the MFD determines the AFR, it needs to make sure that the disk+buffer can achieve this speed. Disk speed, as a capacity, is not something that is easy to measure, unlike CPU and network capacity. It is highly workload dependent. A more practical way to measure if the disk is at or close to capacity is to look at queue depth and/or average latency. The scheduler's 202 deadline miss counter is a good indicator of what is happening in the system.

Under certain situations, for example, the Web master wants to create a VIP list. The Web master through the user interface management console may set up a policy so that the VIP list receives high quality video which results in a higher AFR for the session. In another example, the Web master can set an average video quality. The Web master can use the user interface manager console to set an average AFR.

In a possible embodiment, the MFD does not want to send a higher video quality to a client that cannot play the high quality video. For example, a PC/Laptop can play high quality videos, but an iPhone/g-phone/Palm, etc., only has very small screen and therefore cannot play a high quality video. It is completely unnecessary to send over high quality videos to these kinds of devices.

Figure 11:
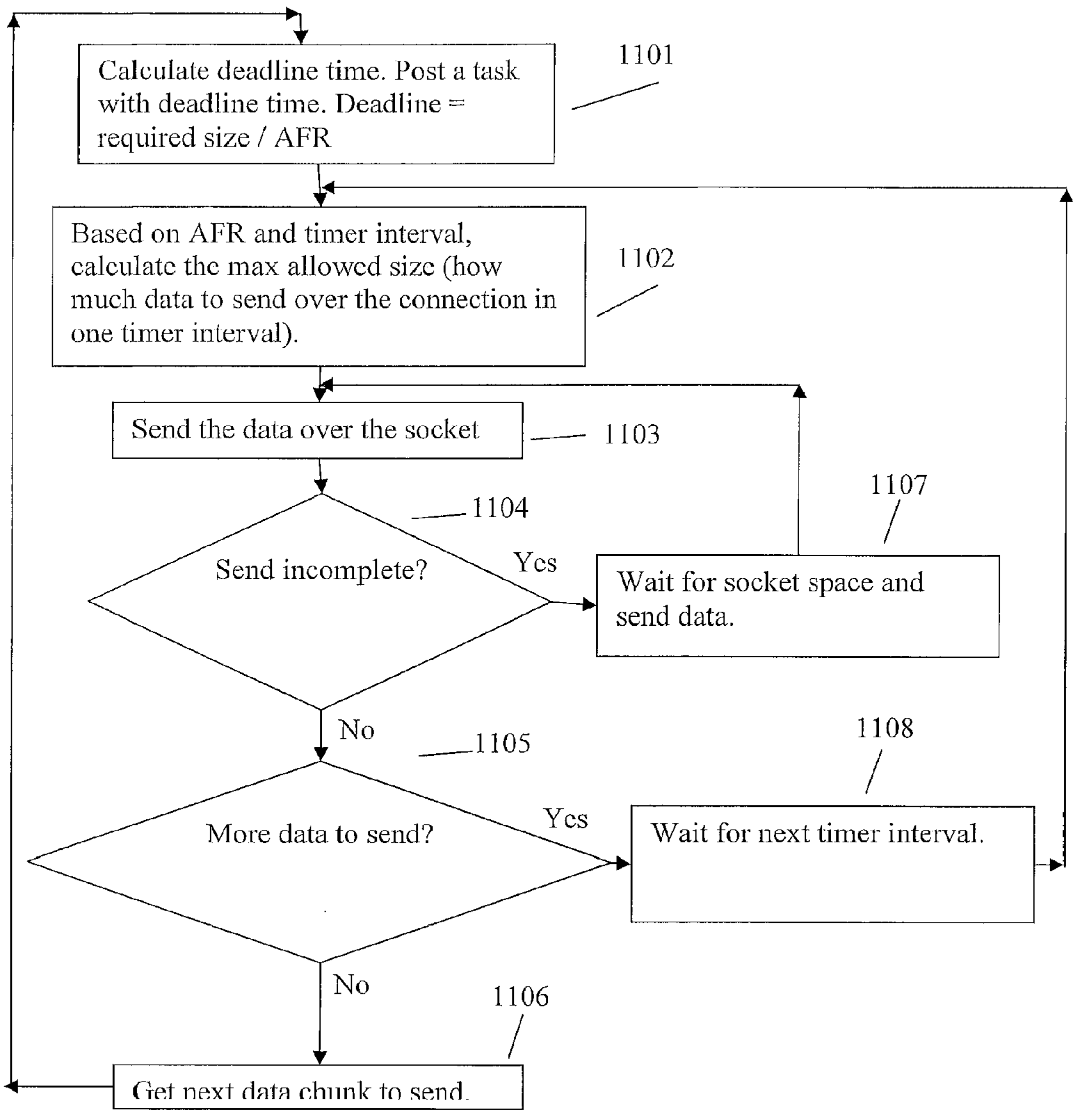
FIG. 11 illustrates a flow chart of a network manager in a MFD, according to an embodiment of the invention.

Referring to FIG. 11, a data flow is shown for a possible embodiment of the AFR portion of the network manager in the optimized network stack 211 sending data out after the HPE posted a task to the scheduler 202 and the scheduler 202 returned a chunk of data. If the calculated size of data cannot be sent out within one timer interval slot (e.g., once a second), it means an AFR miss occurred in the network manager. If scheduler 202 does not return a task within a deadline miss time, it means an AFR miss in the disk manager 206.

The network manager calculates the deadline time for the task. It then posts a task with the calculated deadline time 1101. The network manager then calculates the maximum number of bits that can be sent over the connection given the AFR and the timer interval for the transmission period for the socket. This results in the maximum amount of data that can be sent over the connection in one timer interval 1102. The network manager then sends the data over the socket 1103.

If the send was incomplete 1104, e.g., there was not enough space for the data to be sent or the timer interval has lapsed, then the network manager attempts to resend the data over the connection 1107, 1103.

If there was enough space for the data to be sent out/received 1104 (e.g., the buffer level on the client was sufficient, the TCP level was sufficient, the window size was sufficient, more data is to be sent, etc.), then the network manager checks to see if there is more data to send 1105. If more data is available to send, then the network manager puts the socket back into the timer queue to wait for the next timer interval to send more data 1108 and calculates the next maximum number of bits that can be sent over the connection 1102. Otherwise, the network manager is finished with the timer interval and gets the next chunk of data to send 1106.

The process continues until all data from the chunk(s) of data from the scheduler 202 has been sent.

In a possible embodiment, the MFD performs the following in order to maintain the AFR:

1. Connection requested on a network port. If this network port's total connections >max allowed connections, reject the connection.
2. Each connection can only share up to the calculated session bandwidth. In this example=1 Gbps/total connections on this network port.
3. Modification due to maximum session bandwidth configuration.
   a. If maximum configured session bandwidth is configured and the calculated session bandwidth>maximum session bandwidth, set the calculated session bandwidth to maximum configured session bandwidth.
   b. Else make no change.
4. Calculate session AFR.
   a. Set session AFR to configured AFR as base suggested AFR.
   b. Call server side player 201 for adjusting the AFR. If error message is returned by server side player 201, close session.
5. Modification due to balanced AFR calculation.
   a. If calculated session bandwidth>1.2*AFR, set the calculated session bandwidth to 1.2*AFR.
   b. Else make no change.
6. Modification due to AFR.
   a. If the calculated session bandwidth<AFR, set the calculated session bandwidth to AFR.
   b. Else make no change.
7. The calculated session bandwidth is enforced in every epollout event or task completion, on whenever data is about to be sent out to the client.

The network and HTTP manager provide three parameters to the server side player 201 for calculating the server side player 201 AFR value. The three parameters are:

URI.

Client Session Bandwidth (Ceiling value of AFR).

Total available AFR of network bandwidth.

Where:

Total available AFR may be trimmed by network module.

Total available AFR≠Total network bandwidth −Σ AFR of existing sessions.

Total available AFR=min (Total network bandwidth −Σ AFR of existing sessions, configured maximum AFR)

In the server side player 201 AFR calculation, the return AFR value can be less than client session bandwidth and total available AFR. The server side player 201 can be called at the time after the HPE finishes HTTP parsing. The HPE provides all HTTP information (such as URI, etc.) as well as a flag to show this is a new session or a continuing session with the same connection.

The server side player 201 does not close a continuing session GET request but should be allowed to close a new session. The server side player 201 sets the AFR to the value specified in the URI request. If the server side player 201 is unable to set the AFR to the requested value, it returns an error code to the HTTP Engine that will close the connection.

The scheduler 202 deadline misses can be used to measure disk throughput during runtime. The HPE calculates the deadline (using deadline=func (total HTTP bytes/AFR)) in microseconds and sends the deadline to the scheduler 202 when submitting a task to the scheduler 202. If a disk operation is over loaded, then the scheduler 202 drops some new tasks. The selected dropped tasks should belong to the first tasks created by a new session. A flag can be set by the HPE to tell the scheduler 202 if a task belongs to a new session or not.

When there are too many disk deadline misses, the scheduler 202 sends feedback to the network manager to reduce the maximum allowed connections in the server structure. This reduces the total session number.

After a disk operation is recovered and the deadline miss issue is passed over, the scheduler 202 tries to recover back to the maximum allowed connections setting in the server structure.

Hint Tracks

Figure 12:
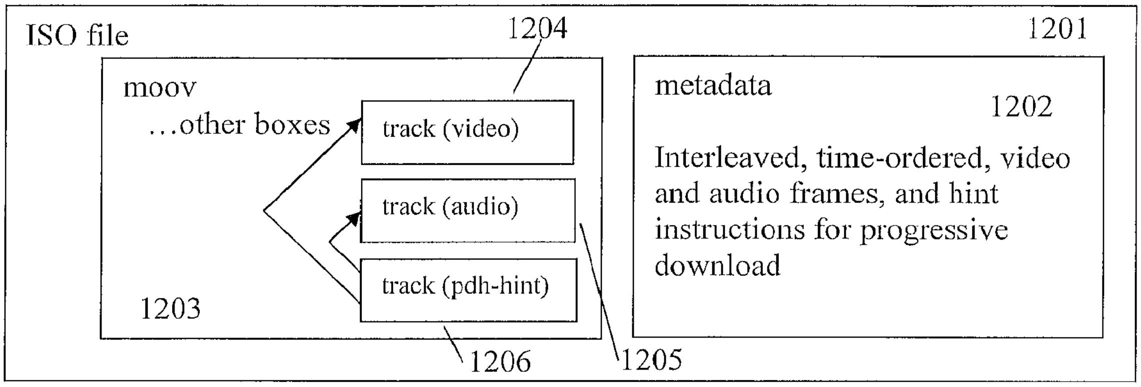
FIG. 12 illustrates a progressive download hint track location in a container file, according to an embodiment of the invention.

Referring to FIG. 12, in a possible embodiment, a progressive download hint track (PDH) 1206 describes to a MFD how to serve media data residing in a file 1201 using progressive download over HTTP. Only one container file 1201 needs to reside in the MFD. Within this container file 1201 a user could store streams 1204, 1205, of varying bit-rates, spatial resolutions or scalable streams. The container file 1201 can also contain metadata 1202 as with MP4 container files. The PDH-Hint track 1206 would be a higher level meta box within the video file container (moov in this example) 1203 that describes to the MFD all the options available to it to support PDH.

In a possible embodiment, depending on requests from the client to adapt to varying bandwidth conditions, available client CPU resources, or by the MFD polling the network to account for network latency, the MFD side logic can make intelligent decisions as to how and what kind of bit rate, frame rate, or resolutions it should serve to best meet the conditions of the network and the requirements of the client.

In a possible embodiment, the hint track can be used by the MFD to decide the best rate or resolution to serve and then encapsulate the relevant portion of the time period of media data as a self containerized chunk of MP4 to deliver over HTTP. The media data itself that resides in the generic container does not need to be reformatted in any way.

In a possible embodiment, multiple predefined PDH hint tracks could be created that cover most of the common usage conditions to reduce the load on the MFD side.

In a possible embodiment, a single stream of media data can be used in a server composed to serve at a predefined frame rate (e.g., an H.264 stream coded at $B_1$ kbps at 30 fps). During delivery, depending on network conditions, the MFD can choose to drop the higher temporal enhancement layers (information for which can be easily obtained by the layering boxes in MP4). As such, the rate of the PDH chunk for these lower frame rate portions (e.g., 15 fps, 7.5 fps) would be less than $B_1$ kbps thereby providing a mechanism to quickly adapt to bandwidth fluctuations while not affecting the playback quality experience of the user to a large extent.

In a possible embodiment, an additional hint track (or higher level box) can be used to describe to various options available to support trickplay. Such a hint track (or box) can provide information to the MFD about the speed of fast-forward or rewind (2×/4×/−2×/−4, etc.) along with precise information about relative frame offsets and playback rate that will aid the client player during playback.

In a possible embodiment, the hint track usage could also be extended to support MFD side playlists. These hint tracks can provide information about where ads or video segments need to be inserted and their exact durations. The hint tracks can also provide control mechanism information, for example, if a client player can skip or fast-forward through an ad or video segment. The hint tracks may also contain information about which ad server to contact, if needed, for the dynamic placement of ads or video segments.

MFD Policies

An administrator is able to set policies for the MFD to operate upon. For example, the administrator may desire to have the MFD serve as many clients as possible or serve HD content and retain the quality of the HD content at the cost of serving a large number of clients.

The feedback from the scheduler 202 as to the amount of time that tasks have been late, the number of tasks that have been late, or any other useful metric, can be sent to the server side 201 and/or the output protocol engine 210. The server side 201 can use the information to adjust the number of clients that it is serving or even adjust the quality of the video that it delivers to certain clients in order to resolve the delivery latency. It may be that certain clients running at certain bandwidths are flexible enough to have their bandwidth dynamically lowered.

The output protocol engine 210 can use the information from the scheduler 202 to deny any new client connections until the scheduler 202 passes the output protocol engine 210 statistics that show that the MFD has caught up sufficiently with the desired delivery efficiency. The parameters defining what criteria are used to make such a determination may be defined by an administrator. Such parameters may include performing an action based on the number of clients that are being affected by late deliveries or the amount of latency that exists, e.g., the number of tasks that are missing deadlines.

An administrator may configure the origin server to notify the MFD about which content servers it should communicate with in order to retrieve content when the MFD experiences a cache miss. The origin server can instruct the origin manager 207 to obtain certain content from a specific content server using a specific protocol. The origin server can also define policies on the MFD to tell the origin manager 207 which content is cacheable and which content must be obtained from an origin server, e.g., seldom requested content.

MFD Extensions

The MFD may also be bandwidth limited at the factory. The MFD may be set to not exceed a certain peak bandwidth or number of open sessions. This allows the MFD provider to sell certain levels of service. If a customer requires a higher peak bandwidth or more open sessions, the MFD provider can remotely set the peak bandwidth or maximum number of open sessions of the customer's MFD remotely for a fee that may be a one-time fee or a recurring fee. The MFD may also automatically exceed the maximum bandwidth or maximum number of open sessions and notify the MFD provider of the amount exceeded. The MFD provider may then charge the customer a fee for the exceeded amount. This allows the customer to temporarily handle high activity bursts and not have to purchase an additional MFD or a MFD upgrade.

Load Balancer Interaction

There typically is a load balancer in communication with the peer MFDs. The load balancer can be configured to send a client request to a certain peer MFD when the request is for a specific URL. One of the peer MFDs may a send a table of what URL is available for each peer MFD. Alternatively, each peer MFD can tell the load balancer what URLs it serves. The load balancer can gather all of the information from the peer MFDs and create its own tables or database entries in order to direct client URL requests to the correct peer MFD. The load balancer may use a hashing scheme based on the URL and/or other parameters to determine the MFD to direct a URL request to. This allows the URL content to be distributed among the peer MFDs.

Monitoring and Statistical User Interface

An administrator, or the like, can look at the MFD's stored statistics that the server side player 201 records and can see via textual or graphical representations how the MFD is performing. The media manager 204 also records the number of cache hits and misses as well as what content is the most popular (hot content) or least popular. The media manager 204 can also record the origin servers that it has requested content from and the number of times such requests were made. The user interface allows the administrator to observe the content performance data in a graphical or textual representation. The user interface can present any recorded information for a specified period of time or in real time.

A graphical user interface allows the MFD to use statistical information that it can collect with regard to disk use and content accesses to display graphical charts that visually represent any of:

- Histogram data showing recent data retrieval times per disk.
- Disk access counters.
- Number of videos per disk.
- Amount of free space.
- Number of videos requested.
- Number of videos requested per disk.
- Recent throughput per disk.
- Hits/misses in the buffer cache.
- Various buffer operations.
- Errors (from media manager statistics, media request, etc).
- Number of videos stored.
- Number of videos per cache.
- Number of videos created.
- Number of videos deleted.
- Number of media providers.
- Meta-information about media providers.
- Bandwidth served per cache level (memory, SSD, Disk) as well as Origin sources (HTTP, NFS, etc.).
- Bandwidth served per cache device (each SSD or Disk unit). The caching logic is designed to load level across devices as the workload profile changes with respect to content.
- Bandwidth and connections served per interface port.
- Bandwidth and connections served per protocol (HTTP, RTSP, etc).

Figure 13:
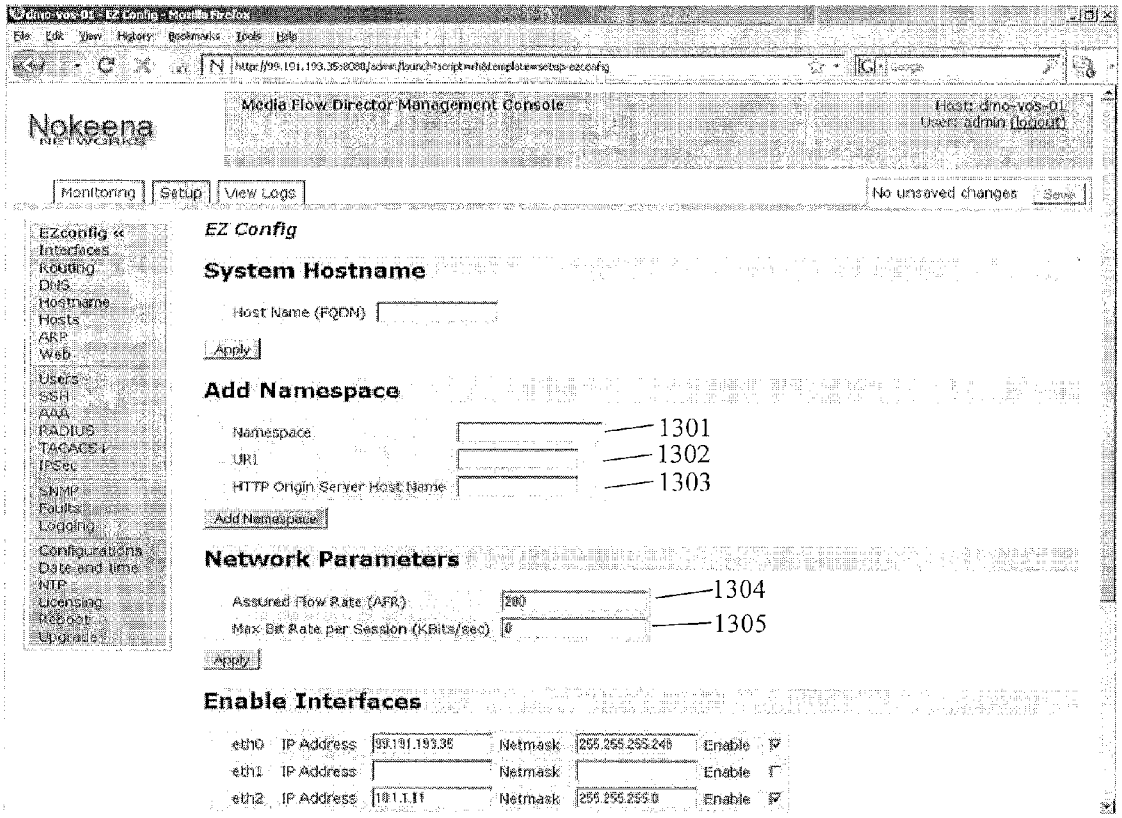
FIG. 13 illustrates a graphical user interface screenshot of a parameter specification screen, according to an embodiment of the invention.

In a possible embodiment, a user may configure parameters relating to the performance characteristics of the MFD. Components such as the server side player and media manager record performance statistics that are used by the graphical user interface to display statistics and graphs to the user. FIG. 13 shows a user interface screen in a possible embodiment where the user can specify parameters such as the AFR 1304 or the maximum bit rate per session 1305. The user can also specify a namespace 1301 along with its URI 1302 and the host name of the HTTP origin server 1303 for the namespace.

Figure 14:
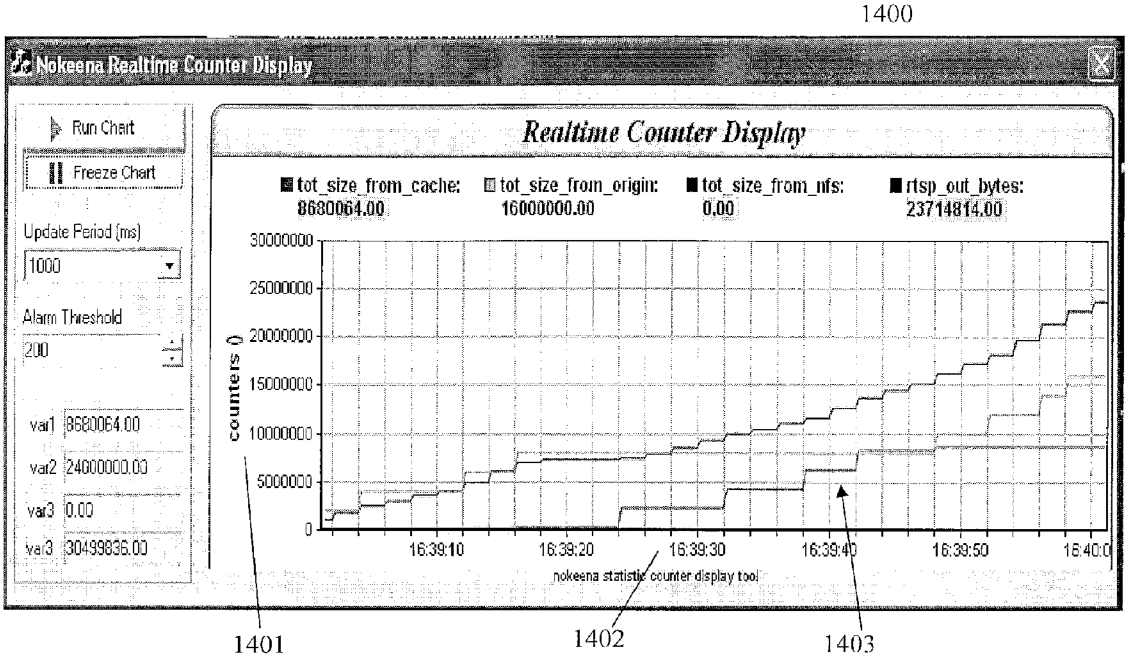
FIG. 14 illustrates a graphical user interface screenshot of a real time byte delivery monitoring graph, according to an embodiment of the invention.

Referring to FIG. 14, in a possible embodiment, a graphical user interface screen 1400 can show a real time graph of the aggregate number of bytes 1401 transferred from the cache, origin server, and total overall bytes delivered to clients over time 1402. The graphical user interface screen 1400 allows the user to see the actual performance of the MFD as it delivers content to clients 1403. The user can customize the policies in the MFD to adjust for cache storage, for example, to handle certain hot content that the user always wants available. The graphical user interface 1400 immediately shows the user the affect that his changes have on the MFD.

Figure 15:
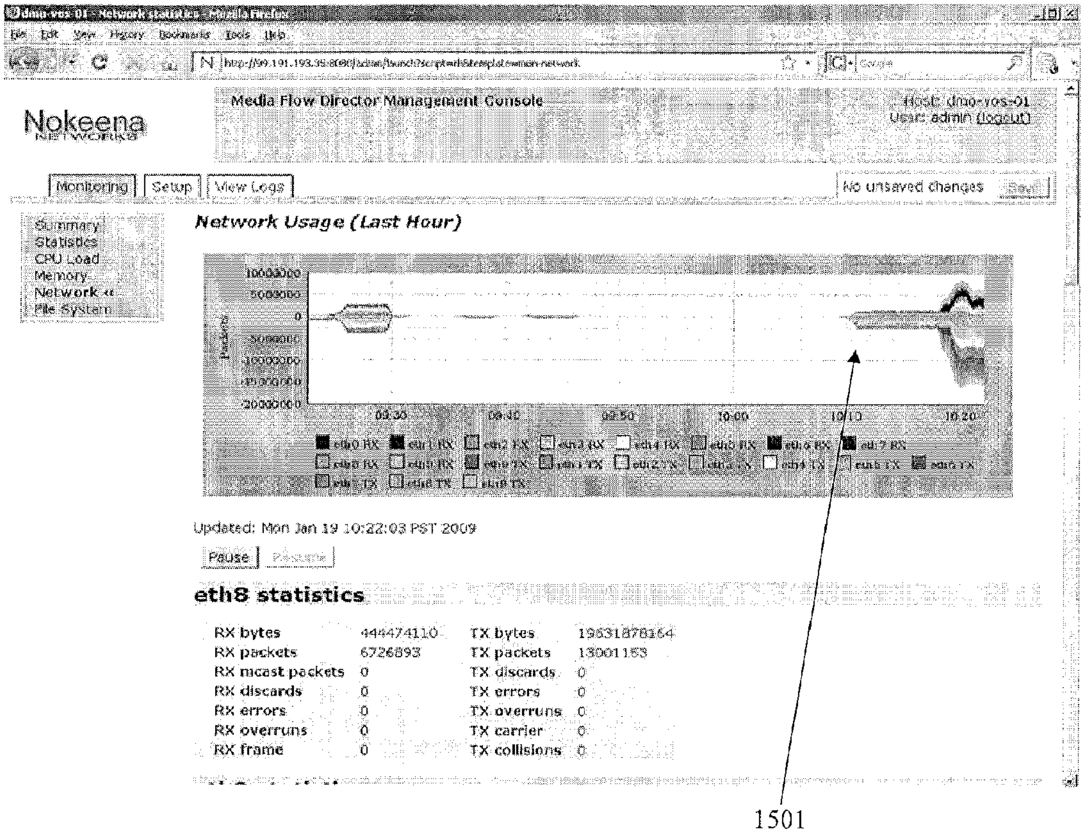
FIG. 15 illustrates a graphical user interface screenshot of a network connection performance monitoring graph, according to an embodiment of the invention.

FIG. 15 shows a screenshot 1500 of the graphical user interface displaying the performance characteristics over the MFD's connections 1501.

3.2 Media Flow Director Placement

Figure 4:
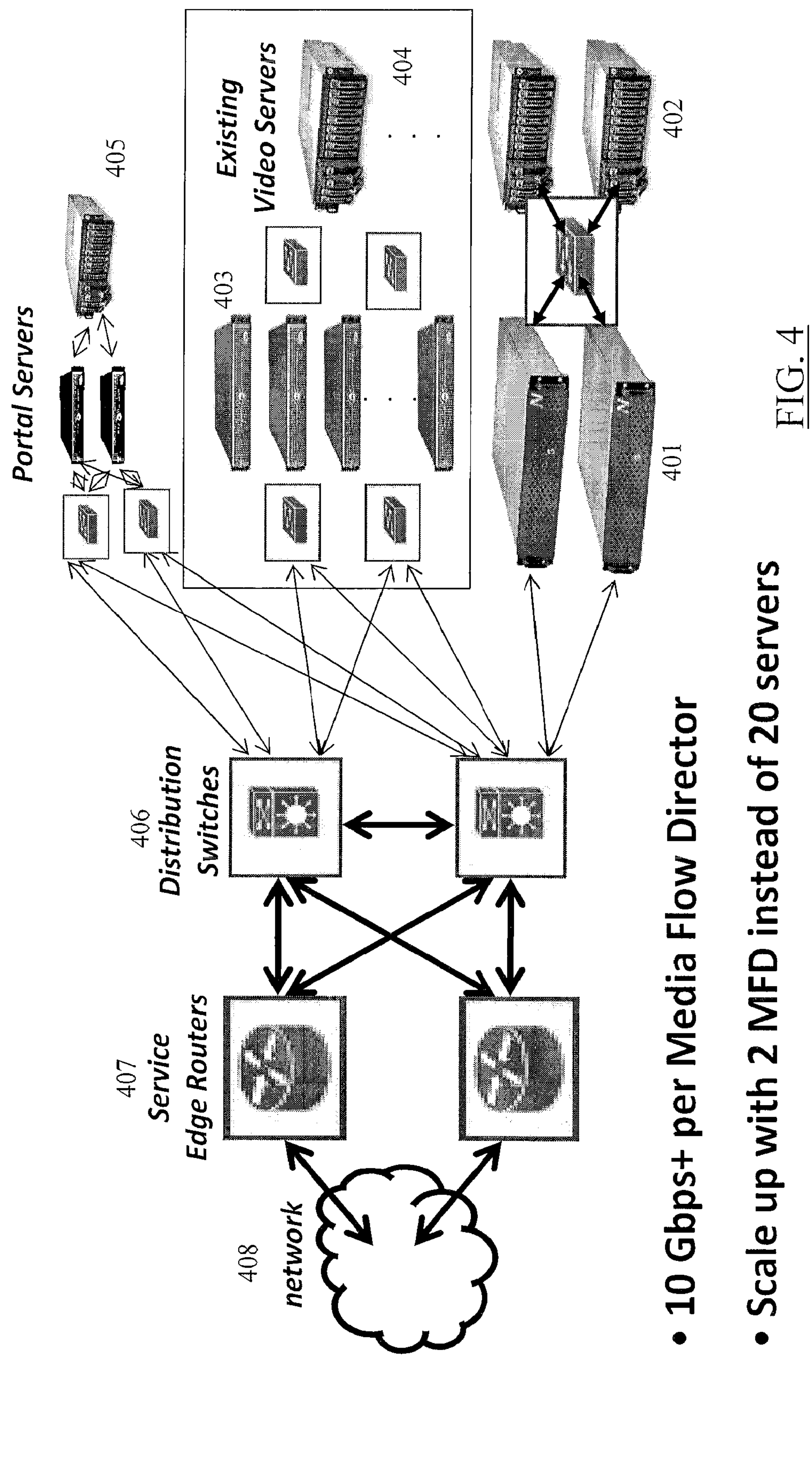
FIG. 4 illustrates a MFD deployment that replaces a conventional video server site, according to an embodiment of the invention.

FIG. 4 illustrates a possible embodiment using MFD's 401 to replace existing video servers 402. Existing video server implementations are typically a group of file servers 403 that cache content from an origin server or a group of origin servers 404. The content from the origin servers 404 are mirrored across many video servers 403. A user, via a client, visits a web page on a portal server 405 to search for video content. The user selects a video from the web page via a link on the page. The URL is sent to a DNS server that resolves the URL to an IP address that a load balancer is responsible for. The client is passed the resolved IP address which is used by the client to make the video request. A router, in a group of edge routers 407, routes the request to the load balancer in a distribution center 406. The load balancer receives the request and forwards the URL request to a video server in the video server cluster 402. The URL request may inform the video server the bit rate of the requested video that the client is expecting. The video server is a file server that has no knowledge of the characteristics of the file that it is delivering other than the fact that it must deliver a certain bit rate version of the video to a client. Typically the name and content is opaque to the video server. Each bit rate of the video is typically a named file. The video server streams the video file to the client and attempts to deliver the video to the client such that the client's video buffer does not become empty.

The client must buffer the received video in order to cover for delays in the streaming of the video from the video server. The client's buffer is meant to give the user a continuous viewing experience. Given that the video servers are serving large amounts of videos to many clients, delivery delays that are created by a server running out of bandwidth or by network delays to a client are frequent and client buffers become empty. As a result, the user either sees the video stream stop playing until the buffer starts to fill again or, for small video files, waits until the entire video has loaded into the buffer before the video starts to play.

In a possible embodiment, one MFD has the ability to achieve a throughput of 10 Gbps+resulting in a single MFD replacing ten or more video servers. Two MFDs 401 can replace a bank of 20 video servers. The MFDs 401 communicate with origin servers 402 in order to obtain video content when a MFD receives a request for URL content that the MFD does not have in storage or the when MFD accepts new video content from an origin server. The MFDs are a direct replacement of video servers and the infrastructure of the portal servers 405, edge routers 407, and distribution switches 406 remains the same.

Figure 5:
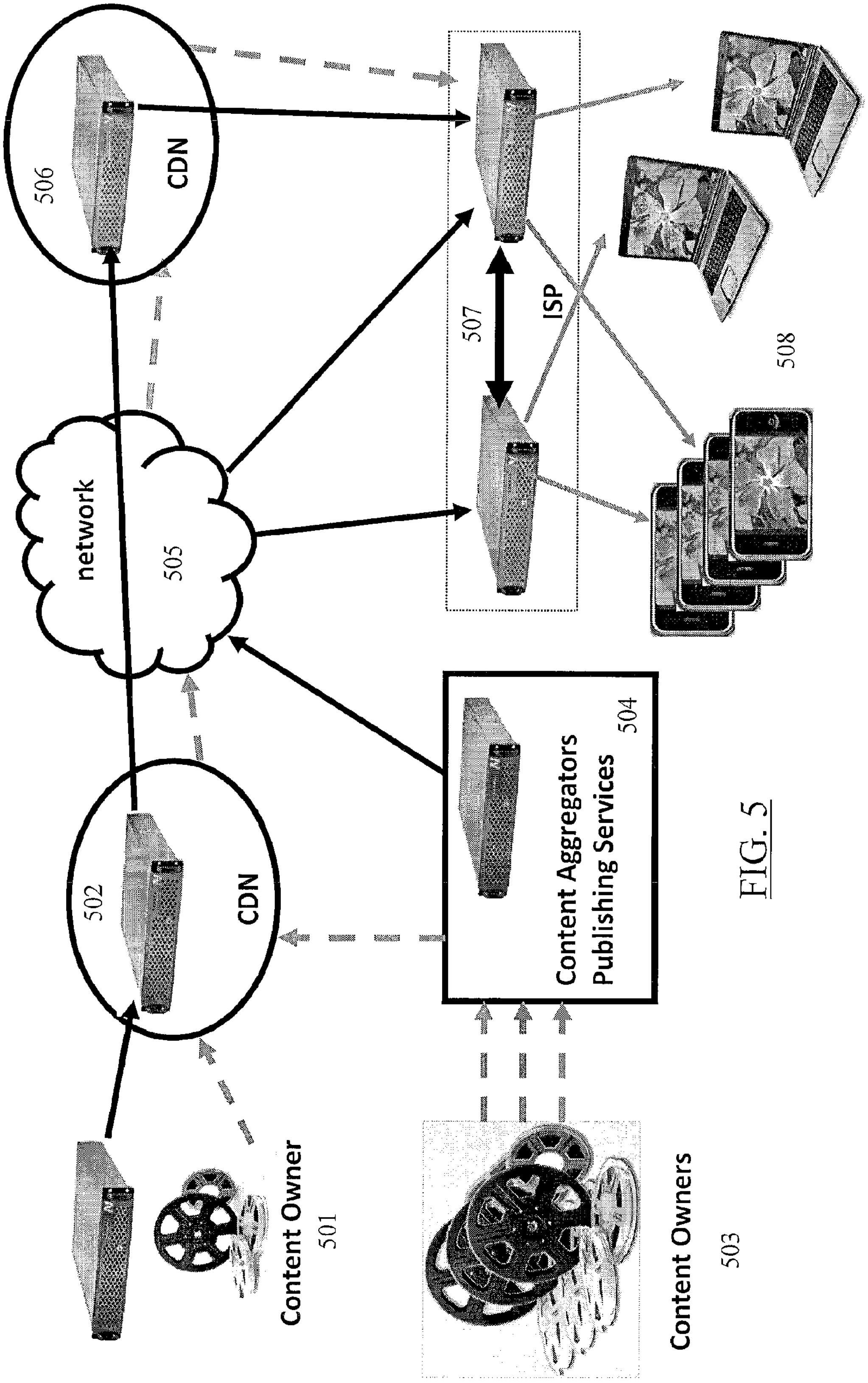
FIG. 5 illustrates an MFD network delivering content to client systems, according to an embodiment of the invention.

FIG. 5 illustrates the placement of MFDs at edge and/or origin locations. In this example, the dashed lines are the data paths for a conventional implementation. A MFD may be installed at a content owner's site 501, a CDN 502, 506, a content aggregator site 504, or an ISP. Any combination of locations may have a MFD installed resulting in faster and more reliable content delivery to clients 508. For example, when two MFDs are installed at an ISP 507, the MFDs are deployed somewhere in the ISP network. This can be either in the same data center in a cluster or in different data centers but in the same ISP access network. The MFDs can communicate with each other to deliver the content more efficiently because, if the MFDs can retrieve the content from within the same network, it is more efficient than retrieving the content from across different and/or multiple different networks or from an origin site. If a large content aggregator 504 deploys an all-MFD private delivery network, the content aggregator sees even more efficiency since the MFDs can use private protocols to processes cache miss processing, pre-staging, data collection, etc., even more efficiently.

When an all-MFD implementation is achieved, there is a dramatic increase in efficiency due to the MFD's ability to retrieve content via the most efficient route.

Note that the term "video content" has been used in embodiment descriptions throughout the text. The term "video content" may be replaced by any media type in the embodiments discussed throughout as the MFD is adaptable to deliver any type of content files, such as: media (audio, pictures, etc.), games, software, HTML, scripts, etc.

4.0 Implementation Mechanisms—Hardware Overview

Figure 6:
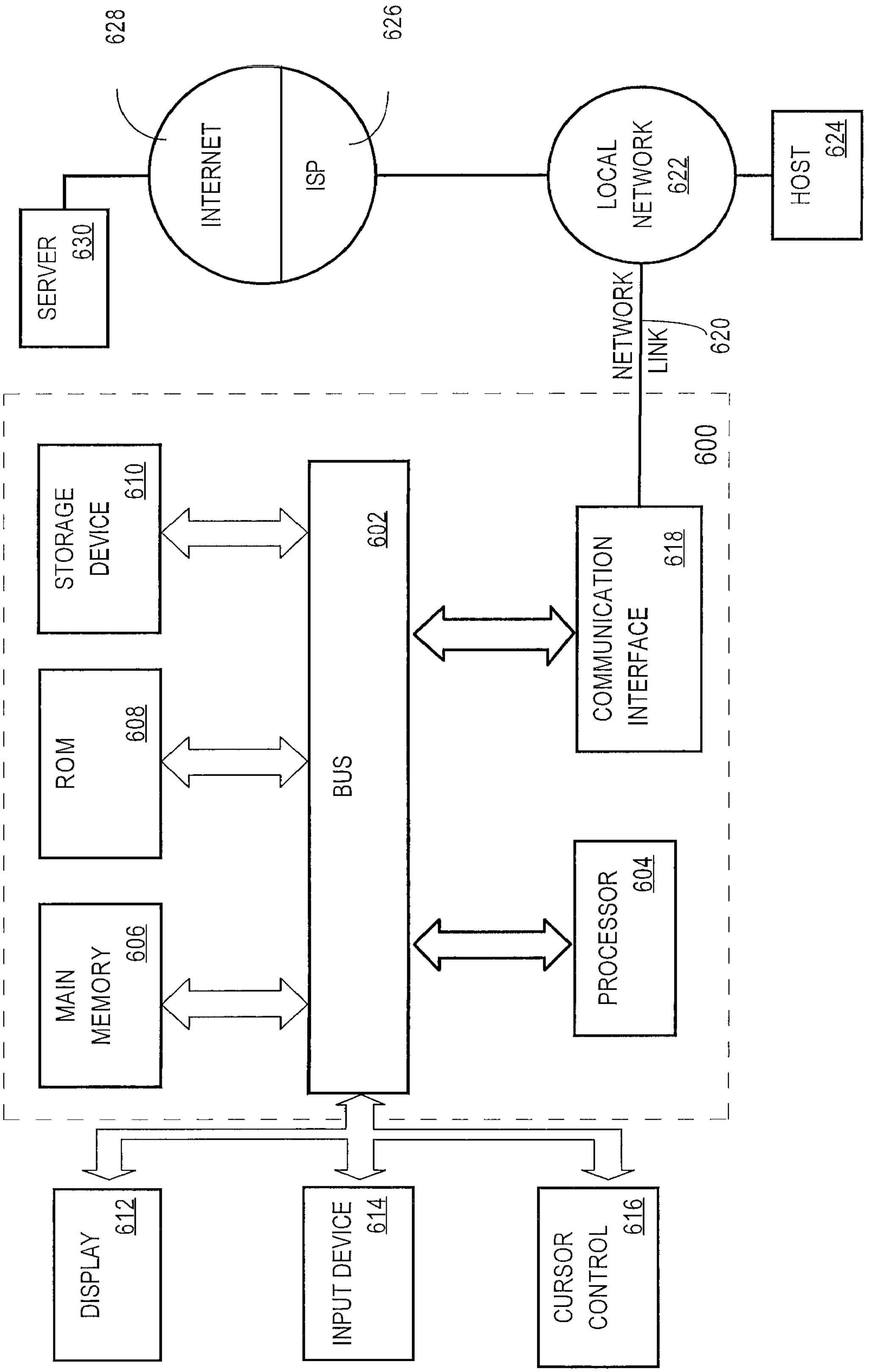
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Examples

In an embodiment, an apparatus comprises: a media delivery request receiver that receives requests for media content from client systems, a flow rate subsystem that calculates a maximum bandwidth and a target flow rate for each outbound media flow, a delivery subsystem that, for each outbound media flow, delivers at least a portion of a requested media content to a client system, a media delivery scheduling subsystem that determines when the delivery subsystem delivers at least a portion of a requested media content, the media delivery scheduling subsystem dynamically adjusts flow rate for each outbound media flow in order to meet the target flow rate for each outbound media flow, the media delivery scheduling subsystem instructs the media delivery request subsystem to refuse incoming media requests when the media delivery scheduling subsystem detects that target flow rates for media flows may not be achieved if additional media content requests are accepted.

In an embodiment, an apparatus further comprises wherein the media delivery scheduling subsystem instructs the delivery subsystem to deliver at least a portion of a lower quality media content in order to meet the target flow rate for a specific media flow.

In an embodiment, an apparatus further comprises wherein the media delivery scheduling subsystem instructs the delivery subsystem to deliver at least a portion of a higher quality media content in order to meet the target flow rate for a specific media flow.

In an embodiment, an apparatus further comprises wherein the media delivery scheduling subsystem detects that a target flow rate for a media flow has not been met when a deadline for delivery of a next portion of a media content for the media flow has been missed.

In an embodiment, an apparatus further comprises a plurality of storage devices, at least a portion of the plurality of storage devices having differing performance characteristics, a media caching subsystem that stores at least a portion of a media content in a specific storage device based at least upon the target flow rate for the media flow associated with the media content and the performance characteristic of the specific storage device, the media caching subsystem instructs the delivery subsystem to deliver the stored portions of the media content from the specific storage device.

In an embodiment, an apparatus further comprises wherein the flow rate subsystem determines a target flow rate for a media flow using at least a measured bandwidth speed of a client system associated with the media flow.

In an embodiment, an apparatus further comprises wherein the flow rate subsystem dynamically determines a target flow rate for a media flow using at least a dynamic measurement of bandwidth speed of a client system associated with the media flow.

In an embodiment, a method comprises or a computer-readable storage medium carrying one or more sequences of instructions, wherein execution of the one or more sequences of instructions by one or more processors causes the one or more processors to perform the steps of: receiving requests for media content from client systems, calculating a maximum bandwidth and a target flow rate for each outbound media flow, delivering at least a portion of a requested media content to a client system for each outbound media flow, determining when the delivering step delivers at least a portion of a requested media content, dynamically adjusting flow rate for each outbound media flow in order to meet the target flow rate for each outbound media flow, refusing incoming media requests when upon detecting that target flow rates for media flows may not be achieved if additional media content requests are accepted.

In an embodiment, a method or computer-readable storage medium further comprises wherein the delivering step delivers at least a portion of a lower quality media content in order to meet the target flow rate for a specific media flow.

In an embodiment, a method or computer-readable storage medium further comprises wherein the delivering step delivers at least a portion of a higher quality media content in order to meet the target flow rate for a specific media flow.

In an embodiment, a method or computer-readable storage medium further comprises detecting that a target flow rate for a media flow has not been met when a deadline for delivery of a next portion of a media content for the media flow has been missed.

In an embodiment, a method or computer-readable storage medium further comprises storing at least a portion of a media content in a specific storage device, among a plurality of storage devices with at least a portion of the plurality of storage devices having different performance characteristics, based at least upon the target flow rate for the media flow associated with the media content and the performance characteristic of the specific storage device, wherein the delivering step delivers the stored portions of the media content from the specific storage device.

In an embodiment, a method or computer-readable storage medium further comprises determining a target flow rate for a media flow using at least a measured bandwidth speed of a client system associated with the media flow.

In an embodiment, a method or computer-readable storage medium further comprises dynamically determining a target flow rate for a media flow using at least a dynamic measurement of bandwidth speed of a client system associated with the media flow.

In an embodiment, an apparatus comprises: a plurality of storage devices, at least a portion of the plurality of storage devices having differing performance characteristics, a media caching subsystem that stores at least a portion of a media content in a specific storage device based at least upon a performance characteristic of the specific storage device, the media caching subsystem orders the plurality of storage devices in a hierarchical fashion based on bandwidth of each storage device among the plurality of storage devices, a storage optimization subsystem that optimizes bandwidth from each storage device among the plurality of storage devices by dynamically relocating portions of media content stored on each storage device based on usage measurements of the storage device.

In an embodiment, an apparatus further comprises wherein the media caching subsystem stores the at least a portion of the media content in the specific storage device based additionally upon a target flow rate for the media flow associated with the media content.

In an embodiment, an apparatus further comprises wherein the storage optimization subsystem relocates a portion of a media content from a first storage device to a second storage device having better performance characteristics than the first storage device based upon an increase in popularity of the portion of the media content.

In an embodiment, an apparatus further comprises wherein the storage optimization subsystem relocates a portion of a media content from a first storage device to a second storage device having lower performance characteristics than the first storage device based upon a decrease in popularity of the portion of the media content.

In an embodiment, an apparatus further comprises wherein the media caching subsystem stores multiple portions of media content that include the at least a portion of the media content in the specific storage device when the multiple portions fit in a specifically sized block of memory on the specific storage device.

In an embodiment, a method comprises or a computer-readable storage medium carrying one or more sequences of instructions, wherein execution of the one or more sequences of instructions by one or more processors causes the one or more processors to perform the steps of: storing at least a portion of a media content in a specific storage device, among a plurality of storage devices with at least a portion of the plurality of storage devices having differing performance characteristics, based at least upon a performance characteristic of the specific storage device, ordering the plurality of storage devices in a hierarchical fashion based on bandwidth of each storage device among the plurality of storage devices, optimizing bandwidth from each storage device among the plurality of storage devices by dynamically relocating portions of media content stored on each storage device based on usage measurements of the storage device.

In an embodiment, a method or computer-readable storage medium further comprises wherein the storing step stores the at least a portion of the media content in the specific storage device based additionally upon a target flow rate for the media flow associated with the media content.

In an embodiment, a method or computer-readable storage medium further comprises relocating a portion of a media content from a first storage device to a second storage device having better performance characteristics than the first storage device based upon an increase in popularity of the portion of the media content.

In an embodiment, a method or computer-readable storage medium further comprises relocating a portion of a media content from a first storage device to a second storage device having lower performance characteristics than the first storage device based upon a decrease in popularity of the portion of the media content.

In an embodiment, a method or computer-readable storage medium further comprises storing multiple portions of media content that include the at least a portion of the media content in the specific storage device when the multiple portions fit in a specifically sized block of memory on the specific storage device.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:

storing, by at least one processor of a device, media content in a memory associated with the device;

receiving, by the at least one processor, a first request and a second request for the media content;

determining, by the at least one processor, a relationship between a plurality of outbound media flows, associated with the requested media content, and a read speed associated with the memory;

using, by the at least one processor, the determined relationship between the plurality of outbound media flows and the read speed associated with the memory to adjust a flow rate for at least one media flow, of the plurality of outbound media flows, to meet a target flow rate for the at least one media flow;

transmitting, by the at least one processor and based on the adjusted flow rate, the at least one media flow associated with the first request for the media content; and selectively transmitting, by the at least one processor and based on the target flow rate, at least one other media flow, of the plurality of outbound media flows, associated with the second request for the media content.

2. The method of claim 1, further comprising:

determining one or more portions of the media content likely to be requested; and adjusting an order of the media content by placing the determined one or more portions of the media content likely to be requested in a cache and removing one or more other portions of the media content not likely to be requested from the cache.

3. The method of claim 2, where, when determining the one or more portions of the media content likely to be requested, the method includes:

using a plurality of tags to apply a logical chunking approach to the one or more portions of the media content.

4. The method of claim 1, where the at least one media flow associated with the first request for the media content is transmitted at a first flow rate, the at least one other media flow, of the plurality of outbound media flows, associated with the second request for the media content is transmitted at a second flow rate, and the first flow rate is different than the second flow rate.

5. The method of claim 1, where, when selectively transmitting the at least one other media flow, of the plurality of outbound media flows, associated with the second request for the media content, the method includes:

refusing the second request for the media content.

6. The method of claim 1, where the first request and the second request are received during a session, and the method further includes:

determining a maximum bandwidth for the session;

determining that the maximum bandwidth for the session is met;

receiving a third request for the media content; and refusing, based on determining that the maximum bandwidth for the session is met, the third request.

7. The method of claim 1, further comprising:

receiving a third request for the media content;

determining, based on receiving the third request for the media content, that the target flow rate will not be achieved; and refusing the third request.

8. A device comprising:

one or more processors to:

store media content in a memory associated with the device;

receive a first request and a second request for the media content;

determine a relationship between a plurality of outbound media flows, associated with the requested media content, and a read speed associated with the memory;

use the determined relationship between the plurality of outbound media flows and the read speed associated with the memory to adjust a flow rate for at least one media flow, of the plurality of outbound media flows, to meet a target flow rate for the at least one media flow;

transmit, based on the adjusted flow rate, the at least one media flow associated with the first request for the media content; and selectively transmit, and based on the target flow rate, at least one other media flow, of the plurality of outbound media flows, associated with the second request for the media content.

9. The device of claim 8, where the one or more processors are further to:

determine one or more portions of the media content likely to be requested; and adjust an order of the media content by placing the determined one or more portions of the media content likely to be requested in a cache and removing one or more other portions of the media content not likely to be requested from the cache.

10. The device of claim 9, where the one or more processors, when determining the one or more portions of the media content likely to be requested, are further to:

use a plurality of tags to apply a logical chunking approach to the one or more portions of the media content.

11. The device of claim 8, where the at least one media flow associated with the first request for the media content is transmitted at a first flow rate, the at least one other media flow, of the plurality of outbound media flows, associated with the second request for the media content is transmitted at a second flow rate, and the first flow rate is different than the second flow rate.

12. The device of claim 8, where the one or more processors, when selectively transmitting the at least one other media flow, of the plurality of outbound media flows, associated with the second request for the media content, are further to:

refuse the second request for the media content.

13. The device of claim 8, where the first request and the second request are received during a session, and the one or more processors are further to:

determine a maximum bandwidth for the session;

determine that the maximum bandwidth for the session is met;

receive a third request for the media content; and refuse, based on determining that the maximum bandwidth for the session is met, the third request.

14. The device of claim 8, where the one or more processors are further to:

receive a third request for the media content;

determine, based on receiving the third request for the media content, that the target flow rate will not be achieved; and refuse the third request.

15. A non-transitory computer-readable medium storing instructions, the instructions comprising:

one or more instructions which, when executed by at least one processor of a device, cause the at least one processor to:

store media content in a memory associated with the device;

receive a first request and a second request for the media content;

determine a relationship between a plurality of outbound media flows, associated with the requested media content, and a read speed associated with the memory;

use the determined relationship between the plurality of outbound media flows and the read speed associated with the memory to determine an adjusted flow rate for at least one media flow, of the plurality of outbound media flows;

transmit, based on the determined flow rate, the at least one media flow associated with the first request for the media content, the at least one media flow associated with the first request for the media content being transmitted at a first flow rate; and selectively transmit, and based on the determined flow rate, at least one other media flow, of the plurality of outbound media flows, associated with the second request for the media content, the at least one other media flow, of the plurality of outbound media flows, associated with the second request for the media content being transmitted at a second flow rate, and the first flow rate being different than the second flow rate.

16. The non-transitory computer-readable medium of claim 15, where the one or more instructions further include:

one or more instructions to determine one or more portions of the media content likely to be requested; and one or more instructions to adjust an order of the media content by placing the determined one or more portions of the media content likely to be requested in a cache and removing one or more other portions of the media content not likely to be requested from the cache.

17. The non-transitory computer-readable medium of claim 16, where the one or more instructions to determine the one or more portions of the media content likely to be requested, further include:

one or more instructions to use a plurality of tags to apply a logical chunking approach to the one or more portions of the media content.

18. The non-transitory computer-readable medium of claim 15, where the one or more instructions to selectively transmit the at least one other media flow, of the plurality of outbound media flows, associated with the second request for the media content, further include:

one or more instructions to refuse the second request for the media content.

19. The non-transitory computer-readable medium of claim 15, where the first request and the second request are received during a session, and the one or more instructions further include:

one or more instructions to determine a maximum bandwidth for the session;

one or more instructions to determine that the maximum bandwidth for the session is met;

one or more instructions to receive a third request for the media content; and one or more instructions to refuse, based on determining that the maximum bandwidth for the session is met, the third request.

20. The non-transitory computer-readable medium of claim 15, where the one or more instructions further include:

one or more instructions to receive a third request for the media content;

one or more instructions to determine, based on receiving the third request for the media content, that a target flow rate will not be achieved; and one or more instructions to refuse the third request.

* * * * *